US012764693B2

(12) United States Patent
Gupta et al.

(10) Patent No.: US 12,764,693 B2
(45) Date of Patent: Oct. 13, 2026

(54) APPARATUS AND METHOD FOR PERFORMING NETWORK FUNCTION MANAGEMENT AND DISCOVERY IN WIRELESS NETWORK

(71) Applicant: Samsung Electronics Co., Ltd., Suwon-si (KR)

(72) Inventors: Varini Gupta, Bangalore (IN); Ashok Kumar Nayak, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 18/351,136

(22) Filed: Jul. 12, 2023

(65) Prior Publication Data

US 2024/0023047 A1 Jan. 18, 2024

(30) Foreign Application Priority Data

Jul. 15, 2022 (IN) ............................. 202241040592
May 18, 2023 (IN) ............................. 202241040592

(51) Int. Cl.
*H04W 60/04* (2009.01)
*H04W 8/00* (2009.01)

(52) U.S. Cl.
CPC ........... *H04W 60/04* (2013.01); *H04W 8/005* (2013.01)

(58) Field of Classification Search
None
See application file for complete search history.

(56) References Cited

U.S. PATENT DOCUMENTS

| | | | | |
|---|---|---|---|---|
| 10,833,938 B1 * | 11/2020 | Rajput | .................... | H04L 67/30 |
| 11,399,281 B2 * | 7/2022 | Tsiatsis | ............... | H04W 12/041 |
| 11,563,638 B1 * | 1/2023 | Jayaramachar | ..... | H04L 41/0816 |
| 11,652,895 B1 * | 5/2023 | Sapra | .................. | H04L 41/5058 709/223 |

(Continued)

FOREIGN PATENT DOCUMENTS

| | | |
|---|---|---|
| WO | 2020202043 A1 | 10/2020 |
| WO | 2022028699 A1 | 2/2022 |

OTHER PUBLICATIONS

3GPP TS 23.501 V18.2.0 (Jun. 2023), Technical Specification, 3rd Generation Partnership Project; Technical Specification Group Services and System Aspects; System architecture for the 5G System (5GS); Stage 2 (Release 18), Jun. 2023, 694 pages.

(Continued)

*Primary Examiner* — Otis L Thompson, Jr.

(57) ABSTRACT

The disclosure relates to a 5G or 6G communication system for supporting a higher data transmission rate. Embodiments herein disclose methods for performing network function (NF) management and discovery in a wireless network. The method includes receiving, by a network repository function (NRF) device, a first registration request to register common data in a separate profile from a first NF instance entity, and receiving, by the NRF device, a second registration request to register an NF instance profile from the first NF instance entity. The NF instance profile includes NF instance specific data and a pointer for a profile of the common data.

16 Claims, 17 Drawing Sheets

(56) References Cited

U.S. PATENT DOCUMENTS

| | | | | |
|---|---|---|---|---|
| 11,743,363 | B1 * | 8/2023 | Goel | H04L 67/51 709/201 |
| 12,363,593 | B2 * | 7/2025 | Forsman | H04W 84/00 |
| 2020/0028920 | A1 | 1/2020 | Livanos et al. | |
| 2020/0177457 | A1 * | 6/2020 | Seenappa | H04L 41/0873 |
| 2020/0195445 | A1 * | 6/2020 | Zhang | H04W 12/108 |
| 2020/0228420 | A1 * | 7/2020 | Dao | H04L 43/08 |
| 2020/0228986 | A1 * | 7/2020 | Anandan | H04W 12/08 |
| 2020/0314615 | A1 | 10/2020 | Patil et al. | |
| 2020/0314672 | A1 * | 10/2020 | Farooq | H04L 43/0817 |
| 2020/0396678 | A1 * | 12/2020 | Lee | H04W 8/08 |
| 2020/0404471 | A1 * | 12/2020 | Bartolomé Rodrigo | H04W 8/20 |
| 2021/0120473 | A1 * | 4/2021 | Yao | H04W 36/0079 |
| 2021/0136558 | A1 * | 5/2021 | Taft | H04W 8/20 |
| 2021/0204199 | A1 * | 7/2021 | Yu | H04W 36/0011 |
| 2021/0258861 | A1 * | 8/2021 | Wang | H04W 48/10 |
| 2021/0258864 | A1 * | 8/2021 | Jeong | H04W 48/16 |
| 2021/0258871 | A1 * | 8/2021 | Jeong | H04W 8/02 |
| 2021/0367854 | A1 * | 11/2021 | Lee | H04L 41/0895 |
| 2021/0385286 | A1 * | 12/2021 | Wang | H04L 67/51 |
| 2022/0014888 | A1 * | 1/2022 | S Bykampadi | H04W 12/069 |
| 2022/0015023 | A1 * | 1/2022 | De-Gregorio-Rodriguez | H04W 48/18 |
| 2022/0030495 | A1 * | 1/2022 | Qiao | H04W 24/04 |
| 2022/0038545 | A1 * | 2/2022 | Krishan | H04L 67/1014 |
| 2022/0045991 | A1 * | 2/2022 | Khare | H04L 63/0281 |
| 2022/0104162 | A1 * | 3/2022 | Aggarwal | H04L 67/51 |
| 2022/0141647 | A1 * | 5/2022 | Castellanos Zamora | H04W 8/186 455/418 |
| 2022/0167157 | A1 * | 5/2022 | Tiwari | H04L 9/3242 |
| 2022/0191294 | A1 | 6/2022 | Yang et al. | |
| 2022/0247827 | A1 * | 8/2022 | Das | G06F 11/1423 |
| 2022/0272537 | A1 * | 8/2022 | Aggarwal | H04L 63/101 |
| 2022/0338104 | A1 * | 10/2022 | Son | H04W 12/06 |
| 2022/0361085 | A1 * | 11/2022 | Rajput | H04W 8/26 |
| 2022/0394453 | A1 * | 12/2022 | Goel | H04L 67/52 |
| 2023/0006888 | A1 * | 1/2023 | Turina | H04L 41/082 |
| 2023/0143244 | A1 * | 5/2023 | Bao | H04L 67/56 |
| 2023/0171099 | A1 * | 6/2023 | Krishan | H04W 12/069 380/282 |
| 2023/0179481 | A1 * | 6/2023 | Krishan | H04L 67/51 709/223 |
| 2023/0262453 | A1 * | 8/2023 | Baskaran | H04W 48/18 726/1 |
| 2023/0284292 | A1 * | 9/2023 | Hellgren | H04L 41/0803 370/329 |
| 2023/0345307 | A1 * | 10/2023 | Forsman | H04L 41/40 |
| 2023/0362267 | A1 * | 11/2023 | Landais | H04L 67/567 |
| 2023/0413214 | A1 * | 12/2023 | Khare | H04L 43/10 |
| 2024/0007903 | A1 * | 1/2024 | Garcia Martin | H04M 15/8083 |
| 2025/0048305 | A1 * | 2/2025 | Baskaran | H04W 48/16 |

OTHER PUBLICATIONS

3GPP TS 23.502 V18.1.1 (Apr. 2023), Technical Specification, 3rd Generation Partnership Project; Technical Specification Group Services and System Aspects; Procedures for the 5G System (5GS); Stage 2 (Release 18), Apr. 2023, 829 pages.

3GPP TS 29.500 V18.2.0 (Jun. 2023), Technical Specification, 3rd Generation Partnership Project; Technical Specification Group Core Network and Terminals; 5G System; Technical Realization of Service Based Architecture; Stage 3 (Release 18), Jun. 2023, 142 pages.

3GPP TS 29.501 V18.2.0 (Jun. 2023), Technical Specification, 3rd Generation Partnership Project; Technical Specification Group Core Network and Terminals; 5G System; Principles and Guidelines for Services Definition; Stage 3 (Release 18), Jun. 2023, 84 pages.

3GPP TS 29.510 V18.3.0 (Jun. 2023), Technical Specification, 3rd Generation Partnership Project; Technical Specification Group Core Network and Terminals; 5G System; Network Function Repository Services; Stage 3 (Release 18), Jun. 2023, 347 pages.

International Search Report and Written Opinion of the International Searching Authority dated Sep. 21, 2023, in connection with International Application No. PCT/KR2023/009074, 7 pages.

Supplementary European Search Report dated Jul. 30, 2025, in connection with European Application No. 23839843.2, 16 pages.

Nokia, et al., "Discussion on NRF APIs extensions to support NF (Service) Set Profiles," C4-205146, 3GPP TSG-CT WG4 Meeting #101e, E-Meeting, Nov. 3-13, 2020, 15 pages.

Examination report dated Oct. 13, 2025, in connection with Indian Application No. 202241040592, 5 pages.

Communication pursuant to Article 94(3) EPC dated Mar. 4, 2026, in connection with European Application No. 23839843.2, 7 pages.

Office Action dated Jul. 15, 2026, in connection with European Application No. 23839843.2, 10 pages.

* cited by examiner

APPARATUS AND METHOD FOR PERFORMING NETWORK FUNCTION MANAGEMENT AND DISCOVERY IN WIRELESS NETWORK

CROSS REFERENCE TO RELATED APPLICATIONS

This application is based on and claims priority under 35 U.S.C. § 119 to Indian Provisional Patent Application No. 202241040592, filed Jul. 15, 2022, and Indian Complete Patent Application No. 202241040592, filed May 18, 2023, in the Indian Intellectual Property Office, the disclosures of which are incorporated herein by reference.

BACKGROUND

1. Field

Embodiments disclosed herein relate to wireless networks, and more particularly to systems and methods for performing network function management and discovery in the wireless network, in case that network function (NF) instances are deployed in an NF-Set.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Thus, it is desired to address the above-mentioned disadvantages or other shortcomings or at least provide a useful alternative to perform network function management and discovery in wireless networks, in case that network function (NF) instances are deployed in an NF-Set.

SUMMARY

Embodiments of the disclosure is related to apparatuses and methods for performing network function management and discovery in a communication network in case that the network function instances are deployed in an NF-Set.

Embodiments of the disclosure is related to how the member NF-Instances of an NF-Set can register their profile into NRF device without having to duplicate common profile parameters into each NF-Instance's profile.

Embodiments of the disclosure is related to how the NRF device can provide an NF-Set's profile to NF consumer containing common profile parameters of the NF-Instances belonging to the NF-Set.

Embodiments of the disclosure is related to how an NF consumer does not need to be notified via multiple notification due to member NF-Instance's profile changes in case that data-change is in common set of parameters.

Embodiments of the disclosure provide methods for performing NF management and discovery in a wireless network. The method includes receiving, by a NRF device, a first registration request to register a common data in a separate profile from a first NF instance entity. Further, the method includes receiving, by the NRF device, a second registration request to register a NF instance profile from the first NF instance entity. The NF instance profile includes a NF instance specific data and a pointer to profile of the common data.

In an embodiment, the common data refers to profile information common to a plurality of NF-instances.

In an embodiment, the specific data refers to profile information specific to an NF-Instances.

In an embodiment, the NF-Instances belong to an NF-Set.

In an embodiment, the common data refers to data common to NF-Instances belonging to an NF-Set.

In an embodiment, receiving, by the NRF device, the first registration request to register the common data in the separate profile from the first NF instance entity includes receiving, by the NRF device, a first determination request to determine whether a NF set profile for a first NF set exists with the NRF device, sending, by the NRF device, a first response indicating that the NF set profile for the first NF set does not exist with the NRF device based on the determination request, and receiving, by the NRF device, the first registration request to register the common data in the separate profile into the NRF device.

In an embodiment, receiving, by the NRF device, the second registration request to register the NF instance profile from the first NF instance entity includes receiving, from the first NF instance entity, a registration request to register the NF instance profile with the NRF device, sending, by the NRF device, a first response indicating that the profile with common data does not exist with the NRF device, and receiving, by the an NRF device, a registration request to register the common data in the separate profile into the NRF device.

In an embodiment, the second registration request to register the NF instance profile is received using a Nnrf_NF-Management_NFRegister.

Embodiments of the disclosure provide methods for performing NF management and discovery in a wireless network. The method includes receiving, by the NRF device, a discovery request to discover NF-instances of a particular type from a NF consumer. Further, the method includes identifying, by the NRF device, NF instances based on the discovery request. Further, the method includes sending, by the NRF device, a discovery response to the NF consumer. The discovery response includes the NF instance specific data of a plurality of NF-instances, and the pointer to profile containing common-data of the plurality of NF-instances.

In an embodiment, the pointer to profile of the NF set profile instead of the common data is included in the discovery response.

In an embodiment, the method includes receiving, by the NRF device, a discovery request to share the NF-set profile from the NF consumer, in case that the NF consumer determines that the NF-set profile is not available in the NF consumer. Further, the method includes sending, by the NRF device, the NF-set profile to the NF consumer based on the discovery request.

In an embodiment, the method includes receiving, by the NRF device, a subscription request associated with a data change notification for changes in the NF set profile. Further, the method includes determining, by the NRF device, a change in the common data associated with the NF set profile. Further, the method includes sending, by the NRF device, a message indicating the change in the common data associated with the NF set profile to the NF consumer.

Embodiments of the disclosure provide methods for performing NF management and discovery in a wireless network. The method includes categorizing, by a first NF instance entity, NF instances profile data into a common data, and a specific data. Further, the method includes sending, by a first NF instance entity, a first registration request to register a common data in a separate profile into a NRF device. Further, the method includes sending, by the first NF instance entity, a second registration request to register a NF instance profile with the NRF device. The NF instance profile includes a NF instance specific data and a pointer to profile of the common data.

In an embodiment, the common data is identified and registered as "NF-Set" profile in NRF.

In an embodiment, sending, by the NF instance entity, the first registration request to register the common data in a separate profile into the NRF device includes sending, by the first NF instance entity, a first determination request to determine whether a NF set profile for a first NF set exists with the NRF, receiving, by the first NF instance entity, a first response indicating that the NF set profile for the first NF set does not exist with the NRF device based on the determination request, and sending, by the an NF instance entity, the first registration request to register the common data in the separate profile into the NRF device.

In an embodiment, sending, by the NF instance entity, the second registration request to register the NF instance profile with the NRF device includes sending, by the first NF instance entity, a registration request to register a NF instance profile with the NRF device, receiving, by the first NF instance entity, a first response indicating that the profile with common data does not exist with the NRF device, and sending, by the an NF instance entity, a third registration request to register the common data in the separate profile into the NRF device. The NF instance profile includes a NF instance specific data and a pointer to profile of the common data.

Embodiments of the disclosure provide methods for performing NF management and discovery in a wireless network. The method includes sending, by a NF consumer, a discovery request to discover NF instances of a particular type to a NRF device. Further, the method includes receiving, by the NF consumer, a discovery response from the NRF device, wherein the discovery response comprises a NF instance specific data of multiple NF-instances matching requested type, and an indicator to a common data profile.

In an embodiment, the NRF device identifies NF instances based on the discovery request. The NF instances are associated with the NF-instance common data.

In an embodiment, the indicator to the NF set profile instead of the common data is included in the discovery response.

In an embodiment, the method includes sending, by the NF consumer, a request to discover the NF-set profile to the NRF device, upon determining that the NF-set profile is not available in the NF consumer. Further, the method includes receiving, by the NF consumer, the NF-set profile from the NRF device based on the discovery request.

In an embodiment, the method includes sending, by the NF consumer, a subscription request associated with a data change notification for changes in the NF set profile to the NRF device. Further, the method includes receiving, by the NF consumer, a message indicating the change in the common data associated with the NF set profile from the NRF device, upon determining the change in the common data associated with the NF set profile at the NRF device.

Embodiments of the disclosure provide a NRF device including a NF management and discovery controller coupled with a processor and a memory. The NF management and discovery controller is configured to receive a first registration request to register a common data in a separate profile from a first NF instance entity. Further, the NF management and discovery controller is configured to receive a second registration request to register a NF instance profile from the first NF instance entity. The NF instance profile includes a NF instance specific data and a pointer to profile of the common data.

Embodiments of the disclosure provide a NF instance entity including a NF management and discovery controller coupled with a processor and a memory. The NF management and discovery controller is configured to categorize NF instances profile data into a common data, and a specific data. Further, the NF management and discovery controller is configured to send a first registration request to register a common data in a separate profile into a NRF device. Further, the NF management and discovery controller is configured to send a second registration request to register a NF instance profile with the NRF device. The NF instance profile includes a NF instance specific data and a pointer to profile of the common data.

Embodiments of the disclosure provide a NF consumer including a NF management and discovery controller coupled with a processor and a memory. The NF management and discovery controller is configured to send a discovery request to discover NF instances of a particular type to a NRF device. Further, the NF management and discovery controller is configured to receive a discovery response from the NRF device. The discovery response includes a NF instance specific data of multiple NF-instances matching requested type, and an indicator to a common data profile.

Embodiments of the disclosure provides a NRF device including a NF management and discovery controller coupled with a processor and a memory. The NF management and discovery controller is configured to receive a discovery request to discover NF-instances of a particular type from a NF consumer and identify NF instances based on the discovery request. Further, the NF management and discovery controller is configured to send a discovery response to the NF consumer. The discovery response includes the NF instance specific data of a plurality of NF-instances, and the pointer to a profile containing common-data of the plurality of NF-instances.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
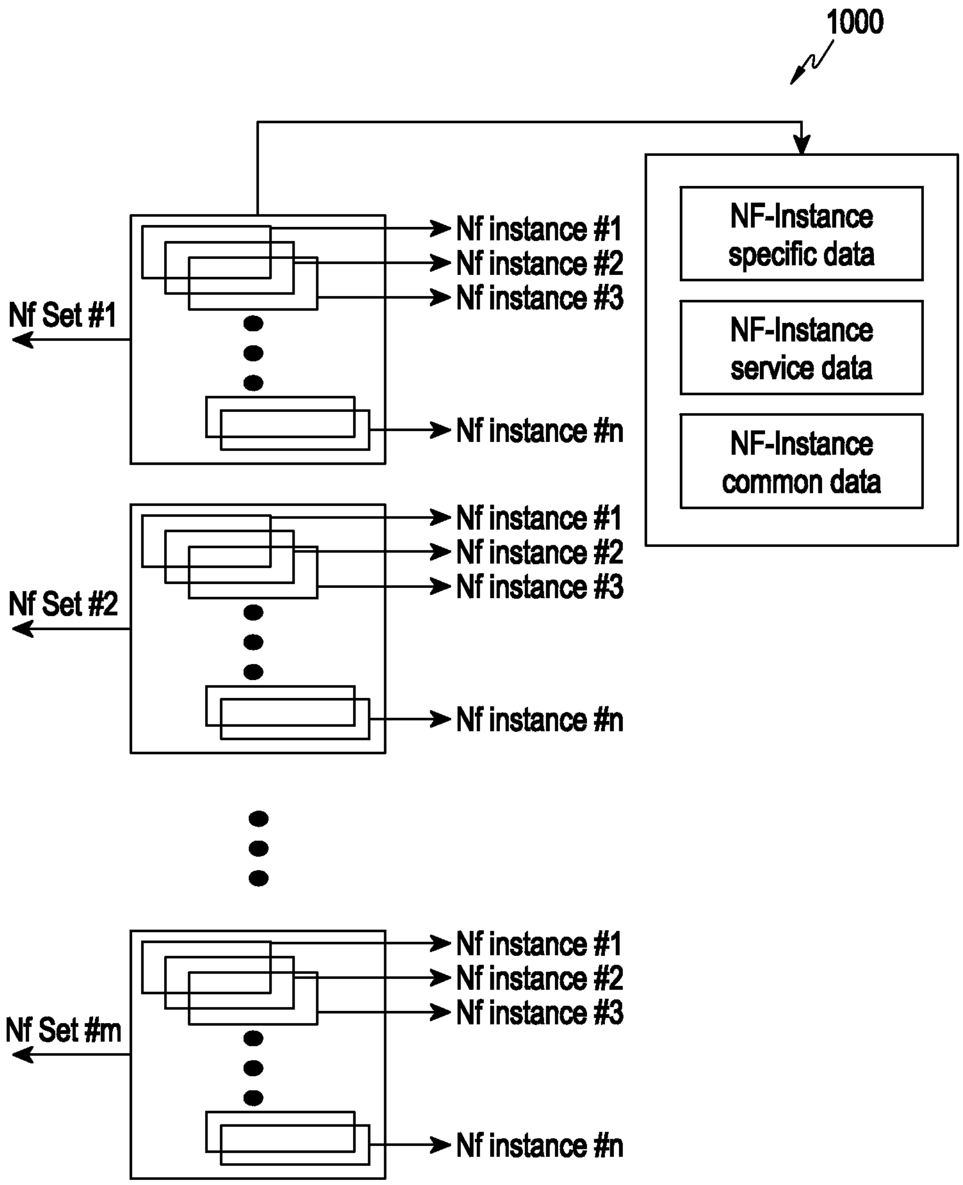
FIG. 1A (PRIOR ART)
FIG. 1A and FIG. 1B illustrate an representation of an example NF-Profile information in NRF device for different NF-Instances and NF-Service-Instances according to prior arts.

FIGS. 1A through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrase.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Embodiments herein achieve methods for performing NF management and discovery in a wireless network. The method includes receiving, by a NRF device, a first registration request to register a common data in a separate profile from a first NF instance entity. Further, the method includes receiving, by the NRF device, a second registration request to register a NF instance profile from the first NF instance entity. The NF instance profile includes a NF instance specific data and a pointer to profile of the common data.

Referring now to the drawings, and more particularly to FIGS. 6 through 17, where similar reference characters denote corresponding features consistently throughout the figures, there are shown at least one embodiment.

The following abbreviations have been referred to herein:

a) NRF—Network Repository Function;

b) NF—Network Function;

c) 3GPP—3rd Generation Partnership Project;

d) NF-Type—Type of Network Function (e.g., AMF, SMF, NEF);

e) PLMN—Public Land Mobile Network; and f) ID—Identifier.

The following references have been referred to herein:

a) 3GPP TS 29.510—Network function repository services;

b) 3GPP TS 29.500—Technical Realization of Service Based Architecture;

c) 3GPP TS 29.501—Principles and Guidelines for Services Definition;

d) 3GPP TS 23.501—System architecture for the 5G System; and e) 3GPP TS 23.502—Procedures for the 5G System.

Figure 4:
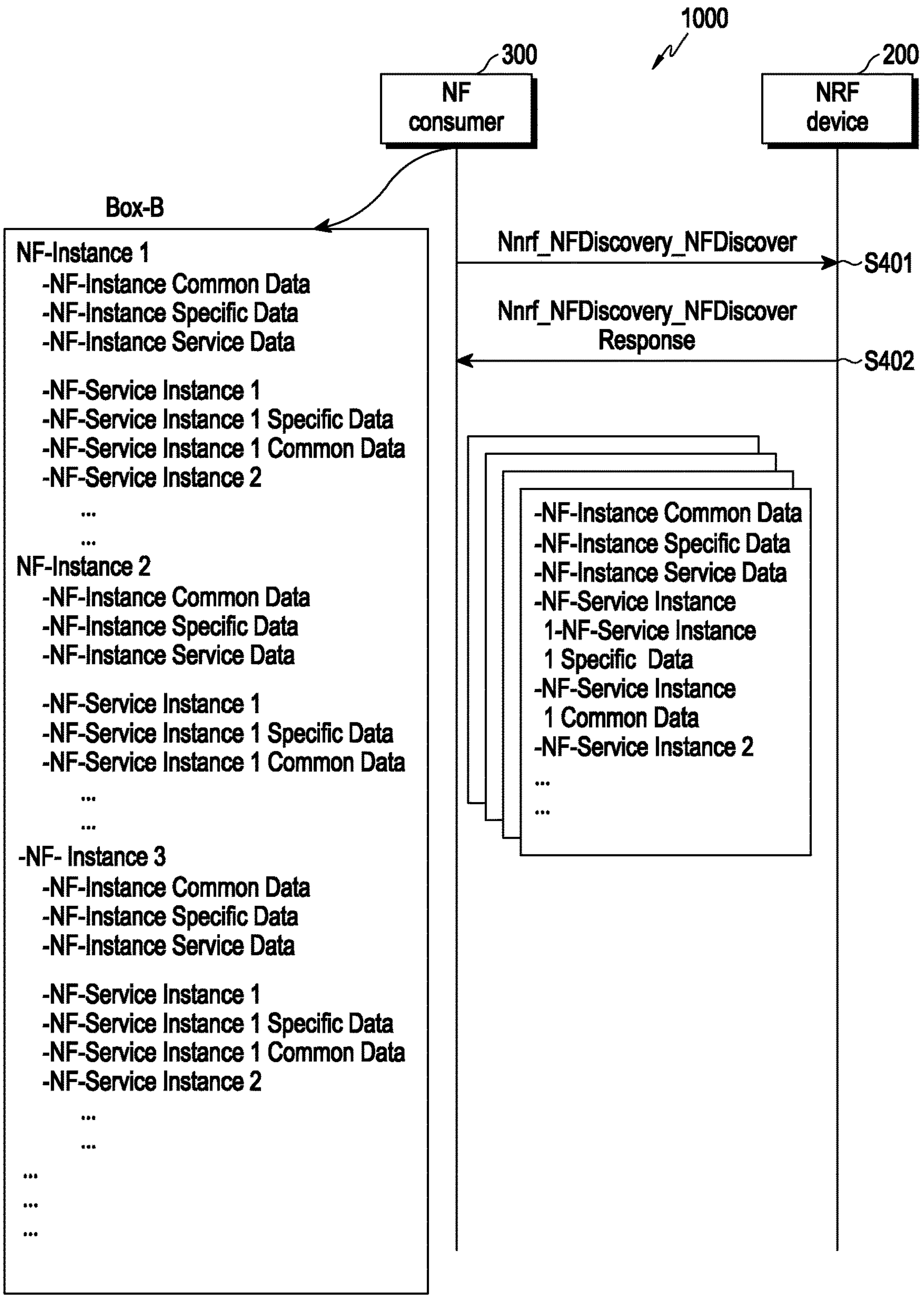
FIG. 4 (PRIOR ART)
FIG. 4 illustrates a representation of an example of NF discovery by NF consumers from the NRF device using Nnrf_NFDiscovery service according to prior arts.

The 3$^{rd}$ generation partnership project (3GPP) Release 15 introduced a service based architecture for a 5G core that involves a set of inter-connected network functions (NFs), each of which are discoverable via a network repository function (NRF) device (e.g., the NRF device 200 of FIG. 4). The NRF device exposes an Nnrf_NFManagement service, where the Nnrf_NFManagement service allows the network functions (e.g., NF producers) to register or update their profile in the NRF device. The profile includes information on NF services offered by the network functions, their authorization policy (e.g., which other NFs are allowed to access them, what are they allowed to access etc.) and other configuration/capability parameters. The NRF device also exposes an Nnrf_NFDiscovery service, which allows the network functions (e.g., NF consumers (300)) to discover the other network functions (NF producers) present in a network (e.g., 5G network) (e.g., the 5G network 1000 of FIG. 4), the services they offer, and other configuration/capability parameters. When the NF consumer (e.g., the NF consumer 300 of FIG. 4) wishes to utilize the NF services offered by an NF Producer, the NF consumer may use the NF service.

The NF consumers may subscribe to notifications from the NRF device to know an operational status of the NF producers they discovered. If there is a change in a subscribed NF producer's profile, the NRF device may send notifications to all subscribing NFs whenever the registered profile information of the NF producer changes. The notification may include at-least one of the updated profile of the NF producer, and the difference from earlier profile. Each Network Function can be deployed such that several network function instances are present within an NF Set to provide distribution, redundancy and scalability together as a set of NF instances. For example, if an NF instance goes down, another NF instance in the set may take-over and thus provide redundancy.

When multiple member NFs (instances) of an NF-Set register their profiles into the NRF device, a lot of redundant information may need to be registered as the NFs of an NF-Set have lot of common configurations (such as configuration/capability parameters, and so on). Similarly, when the NF consumer discovers the NF producer instances of a specific-type, then lot of such redundant information may need to be provided in the discovery response. Worst, the NFs who subscribe to changes in NF-Profile data may be individually notified of the same change against multiple NF-instances.

Figure 1B:
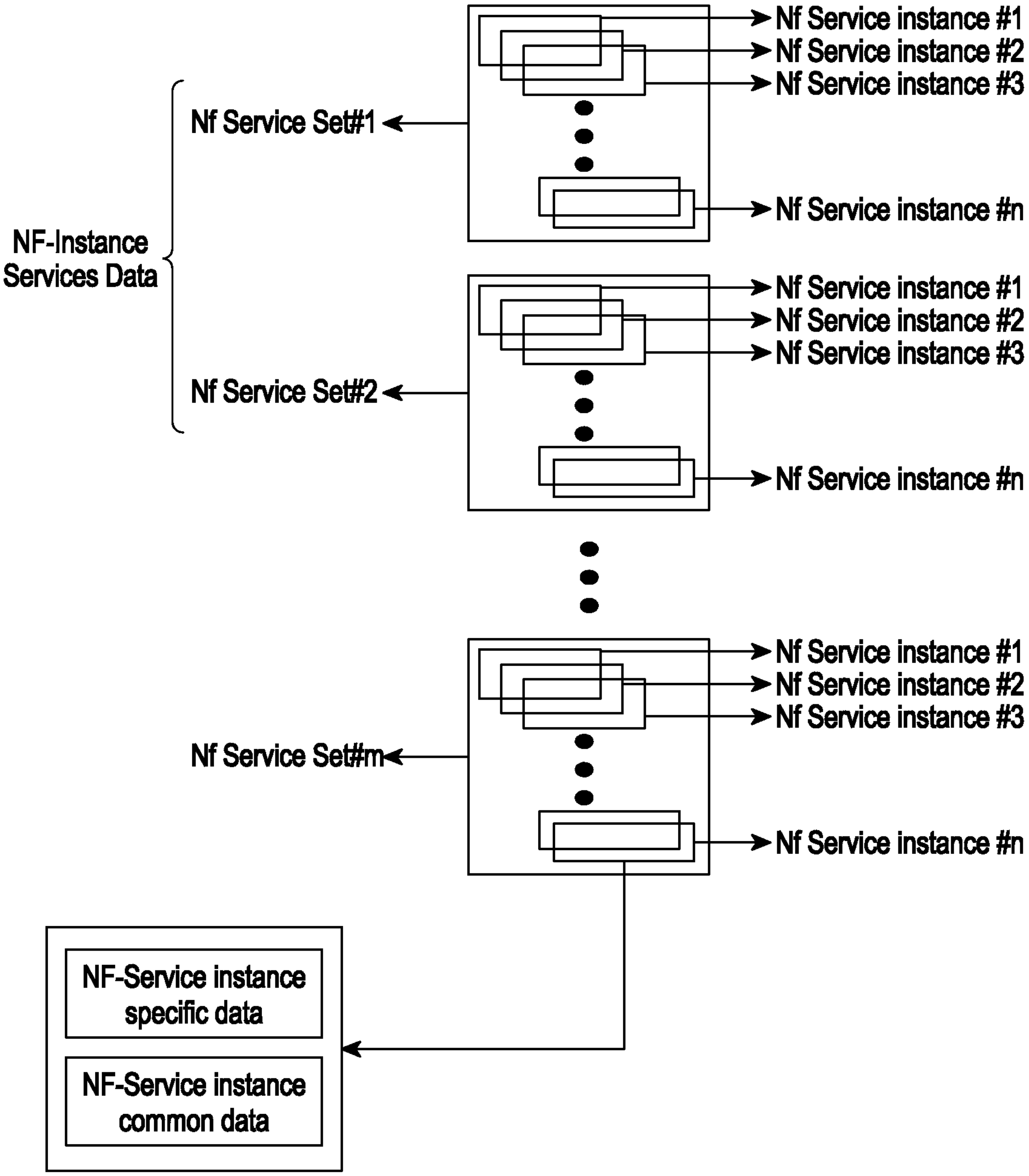
FIG. 1B (PRIOR ART)

FIG. 1A and FIG. 1B illustrates an representation of an example NF-Profile information in NRF device for different NF-Instances and NF-Service-Instances.

Referring to FIG. 1A and FIG. 1B, an example of a plurality of network function (NF) sets is illustrated. Each of the NF sets may contain network function instances 1 . . . n, whereby each NF-Instance's profile consists of an NF-Instance specific data, NF-Instance services data and NF-Instance common data. The NF-Service instances within an NF-Instance can further be deployed in a Service-Set. Hence, FIG. 1A and FIG. 1B show that NF-Instance services data may consist of multiple NF-Service-Sets each containing multiple NF-Service instances.

Figure 2A:
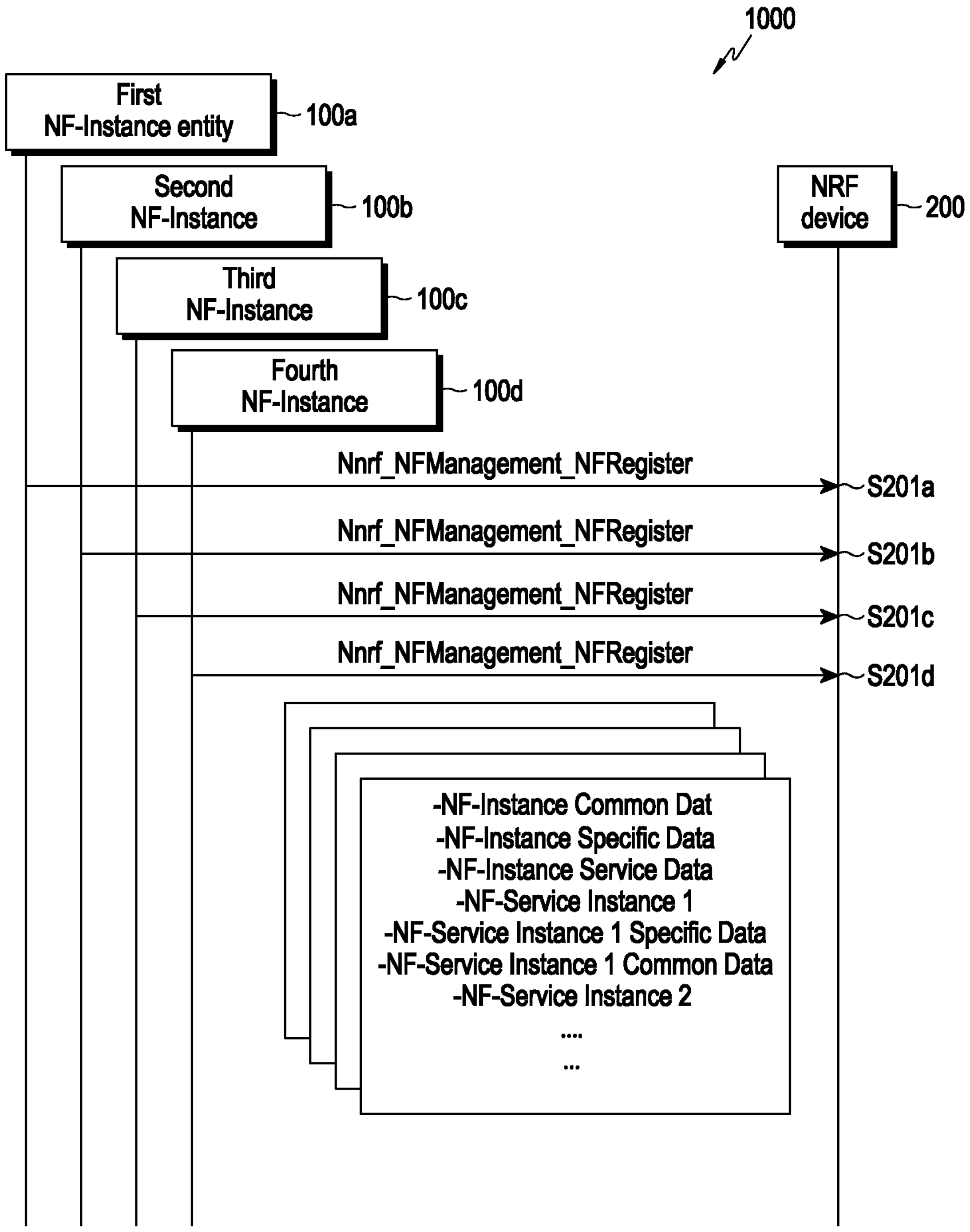
FIG. 2A (PRIOR ART)
FIG. 2A and FIG. 2B illustrate an representation of an example of NF profile registration in NRF device using Nnrf_NFManagement service according to prior arts.
Figure 2B:
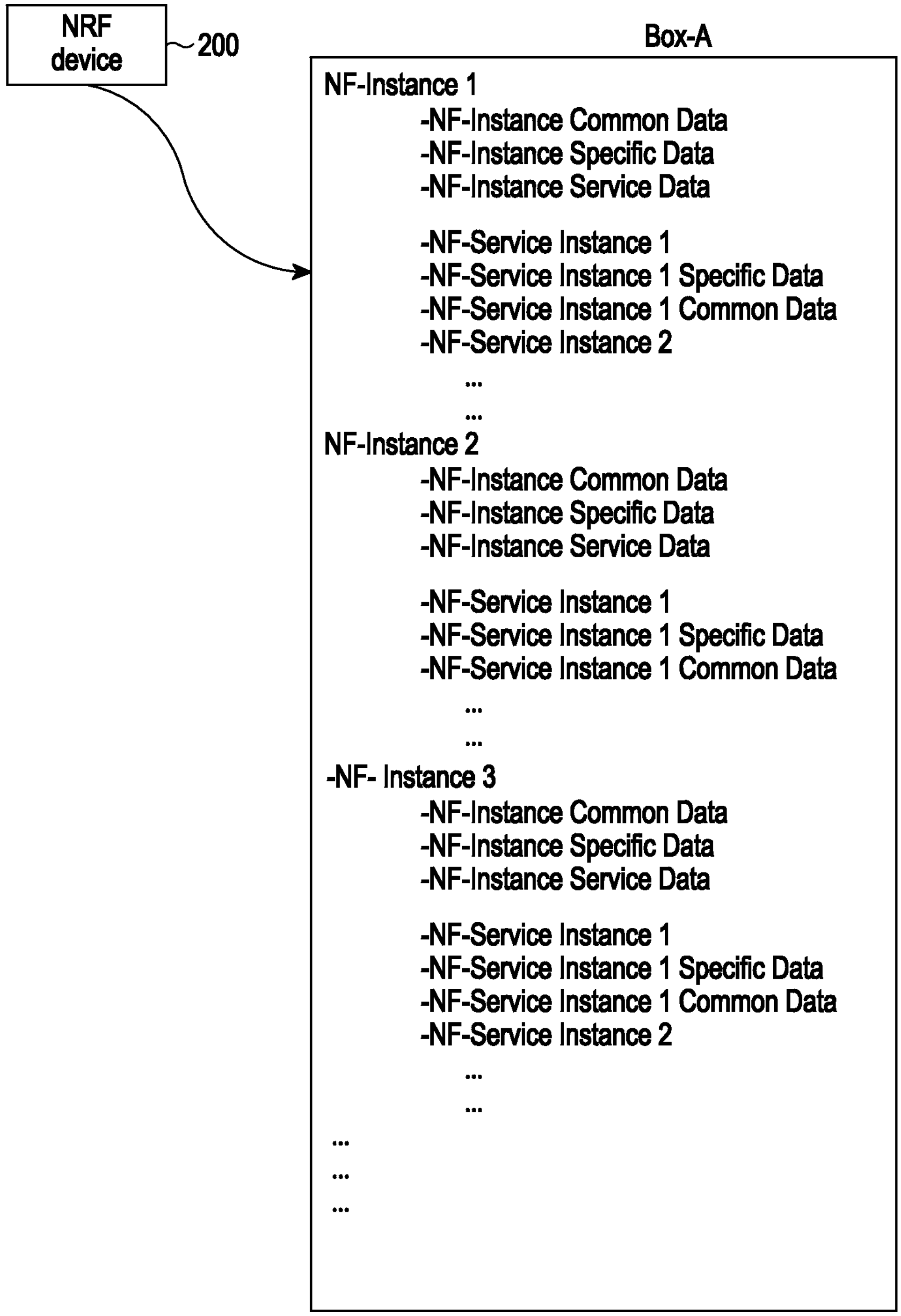
FIG. 2B (PRIOR ART)

FIG. 2A and FIG. 2B illustrates an representation of an example of NF profile registration in NRF device using Nnrf_NFManagement service.

Referring to FIG. 2A and FIG. 2B, the profile of each NF-Service instance contains of NF-Service instance specific data and NF-Service instance common data. It is noted that "NF/NF-Service instance specific data" or "NF/NF-Service instance common data" do not refer to an already existing classification (in the 3GPP specifications) of NF/NF-Service profile data. Rather, they indicate that the NF/NF-Service profile data can be divided into these categories, whereby the specific data refers to profile parameters that are not common across the set, and common data refers to profile parameters that are common across the set.

In the current state of the art, when the NF-Instances (e.g., NF-Instance entities) 100*a*, 100*b*, 100*c*, and 100*d* register their profile into the NRF device 200 using Nnrf_NFManagement service, each NF-Instance 100*a*, 100*b*, 100*c*, and 100*d* in the NF-Set may register its COMPLETE profile into the NRF device (200). That is, if the NF-Set has n instances, each instance may register its profile containing the NF-Instance specific data, the NF-Instance services data and the NF-Instance common data. Further, if each NF-Instance has multiple NF-Service instances belonging to same NF-Service Set, the NF-profile may contain, for each NF-Service instance, the COMPLETE NF-Service profile containing the NF-Service-Instance common data and NF-Service-Instance specific data.

FIG. 2A and FIG. 2B shows an example of how issue manifests during registration of the NF-profiles into the NRF device 200. Consider that there are 4 NF-Instances 100*a* to 100*d*, belonging to same NF-Set, who register their profile into the NRF device 200 by individually sending Nnrf_NF-Management_NFRegister request at steps S201*a*, S201*b*, S201*c*, and S201*d*. Each request may contain some duplicate information (common data) across multiple NF-Instances 100*a* to 100*d* belonging to the same NF-Set, thus increasing the size of Hypertext Transfer Protocol (HTTP) Payload and hence affecting network performance. Additionally, as shown in box-A of FIG. 2B, the NRF device 200 ends up having duplicate information in its database.

Figure 3:
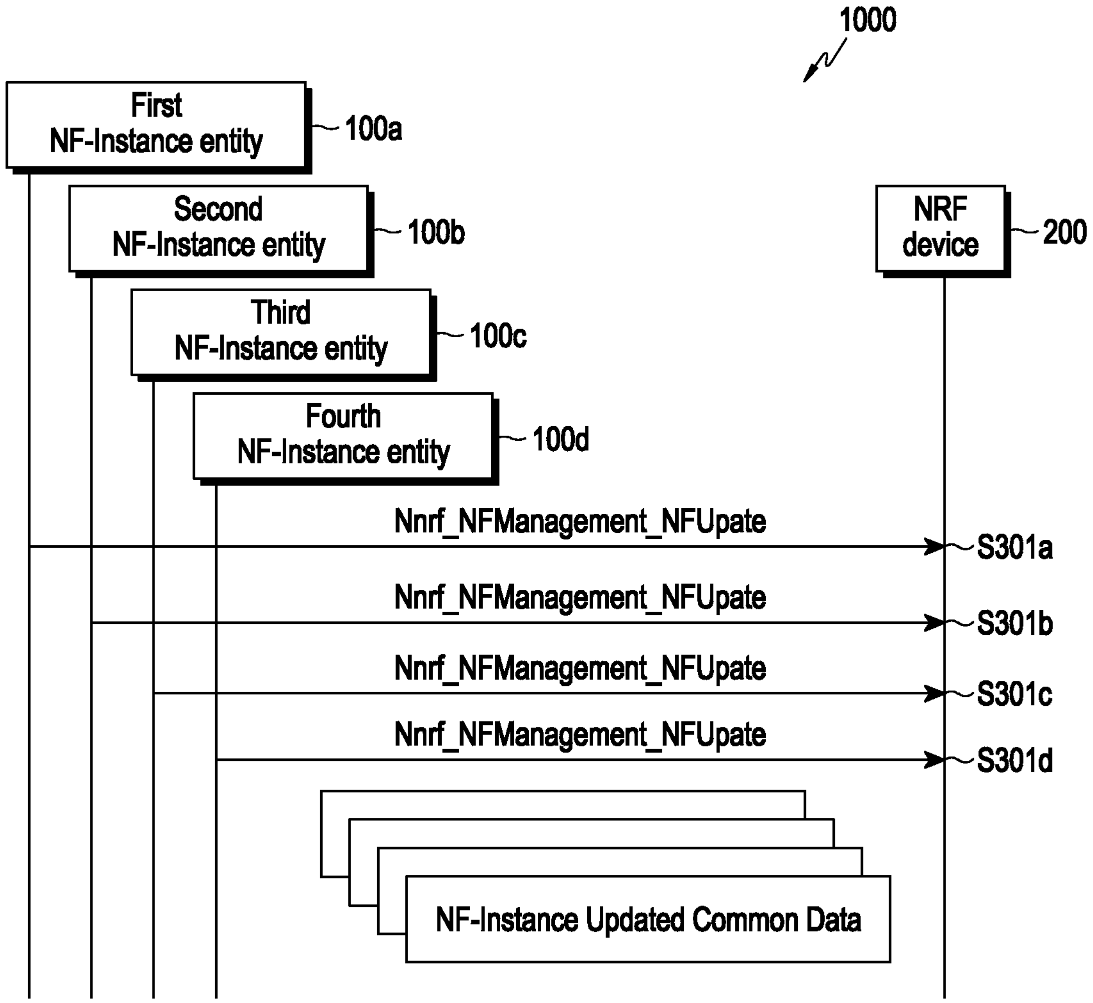
FIG. 3 (PRIOR ART)
FIG. 3 illustrates a representation of an example of NF profile update in NRF device using Nnrf_NFManagement service according to prior arts.

FIG. 3 illustrates a representation of an example of NF profile update in NRF device using Nnrf_NFManagement service.

If, later, there is a change in the NF-Profile of these NF-Instances 100*a* to 100*d*, and even if the change happens to be in "common data," each of these NF-Instances 100*a* to 100*d* may end up updating their profile in NRF device 200 by sending Nnrf_NFManagement_NFUpdate request to NRF device 200 (as shown step S301*a*, S301*b*, S301*c*, and S301*d* of the FIG. 3). It is noted that if the change is in "specific data," those may be updated individually anyway, and are not the object of the present disclosure.

FIG. 4 illustrates a representation of an example of NF discovery by NF consumers from the NRF device using Nnrf_NFDiscovery service.

Referring to FIG. 4, consider the NF consumer 300 who wants to discover the NF-Instances 100*a* to 100*d* of a particular type (e.g., Access & Mobility Management Function (AMF) entity, Session Management Function (SMF) entity or the like) by sending Nnrf_NFDiscovery_NFDiscover request (e.g., step S401) to the NRF device 200. The NRF device 200 may determine its database and provides all these 4 profiles to the NF consumer 300 in Nnrf_NFDiscovery_NFDiscover response (e.g., step S402). The payload body of the response may contain the duplicate information (common data) in each NF's profile, and may thus not only increase size of response, but also, the NF consumer 300 may end up storing large information in its cache and/or database (as shown in Box-B of FIG. 4).

Figure 5:
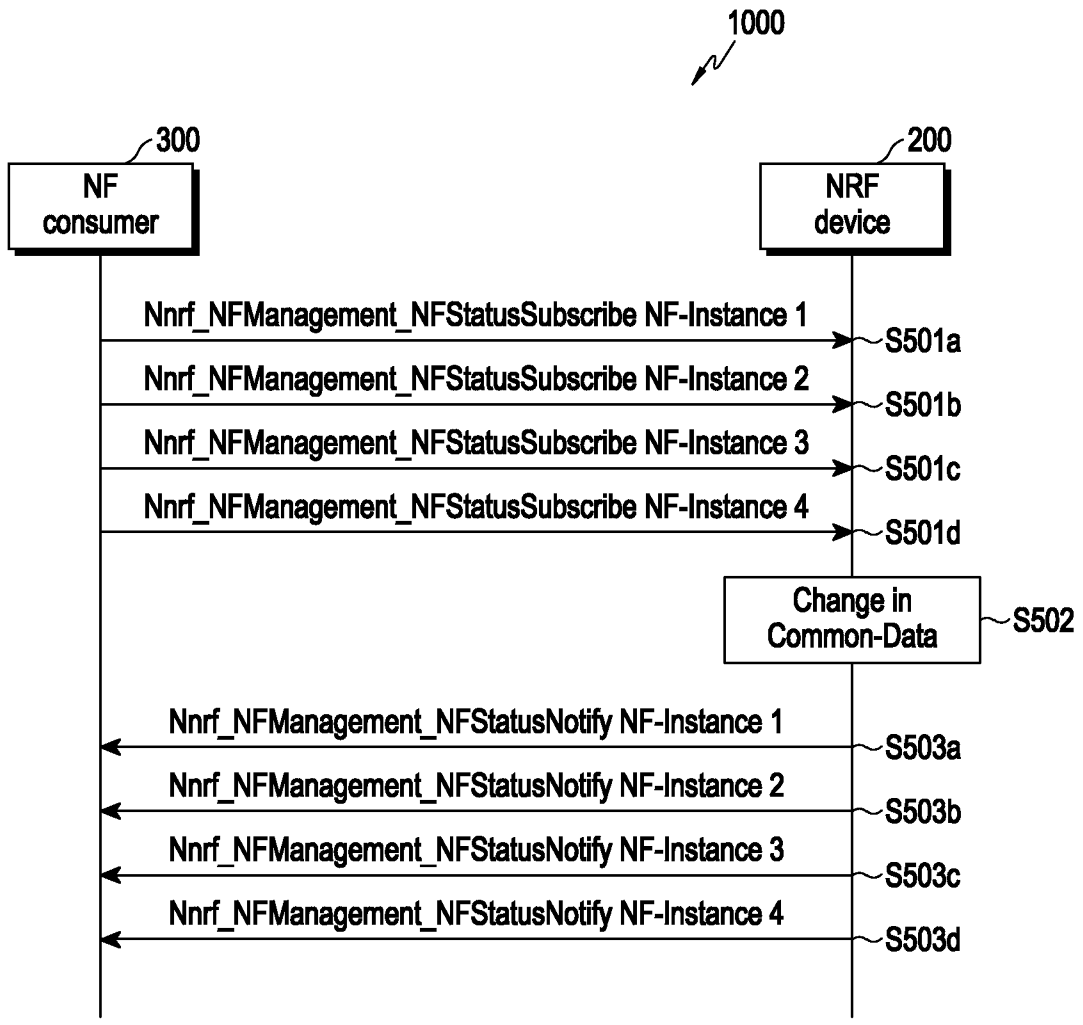
FIG. 5 (PRIOR ART)
FIG. 5 illustrates a representation of an example of NF profile change notification to the subscribing NF consumers using Nnrf_NFManagement service according to prior arts.

FIG. 5 further shows how the inclusion of common data in each NF-instance's profile of NF-Set results in increased signalling during profile change notifications.

Referring to FIG. 5, the NF consumer 300 may need to keep track of profile changes of the NF instance entities 100*a* to 100*d*. Hence, the NF consumer 300 may subscribe to the NRF device 200 to receive data-change notifications using Nnrf_NFManagement_NFStatusSubscribe service operation at steps S501*a*, S501*b*, S501*c*, and S501*d*. The subscription request is done for each NF-Instance 100*a* to 100*d*. At step S502, when, the NRF device 200 may later detect a change in the profiles of the NF-Instances 100*a*-100*d*, e.g., due to NFs performing Nnrf_NFManagement_NFUpdate service operation as shown in FIG. 3 or like so, the NRF device 200 may send a notification to the NF consumer 300. Even if the change is in common-data, the change may end up sending 4 notifications to the NF consumer 300 to update the profile of all the NF-instances 100*a* to 100*d* with the same data at steps 503*a*, 503*b*, 503*c*, and 503*d*. It is noted that if the change is in "specific data," those may be updated individually anyway, and are not the object of the present disclosure.

Thus, the existing implementation of the NRF device 200 and NFs results in duplicate storage of information in the NRF device 200 as well as the NF consumers 300, and increased signalling during register, update, and notification service operations; thus, reducing overall efficiency of the wireless network 1000.

There are other aspects of NF register, discovery, subscribe and notification operations that are important but do not impact embodiments in this document. Hence, those are not shown explicitly here for sake of clarity of understanding.

Thus, it is desired to address the above-mentioned disadvantages or other shortcomings or at least provide a useful alternative.

The provided methods may be used for performing the network function management and discovery in a 5G network in case that the network function instances are deployed in an NF-Set. Embodiments herein disclose how the member NF-Instances of an NF-Set can register their profile into NRF device without having to duplicate the common profile parameters information into each NF-Instance's profile of the NF-Set. Embodiments herein disclose how the NRF device can provide an NF-Set's profile to NF consumer containing common profile parameters of the NF-Instances belonging to the NF-Set. Embodiments herein disclose how an NF consumer does not need to be notified via multiple notifications due to member NF-Instance's profile changes in case that data-change is in common set of parameters. Embodiments improves the efficiency of the system by proposing alternate implementations in NRFs, NF consumers and NF-Producers.

In an embodiment, it is provided that in case that the NF-Instances belonging to a NF-Set register their profile into the NRF device using Nnrf_NFManagement service, they first register "common data" in a separate profile and identify the "common data" using an existing or new identifier unique at-least within a Public Land Mobile Network (PLMN). This separate profile could be an "NF-Set" profile, where the NF-Set can be identified using an existing NF-Set-ID as defined in 3GPP TS 23.003, or a new identifier. The individual NF-profiles of the NF-Instance are then registered into the NRF device without having "common data." Rather, the individual NF-Profiles only contain an indication that information contained in the NF-Set profile (registered separately and identified using the NF-Set identifier) also applies to this NF-Instance's profile.

Figure 6:
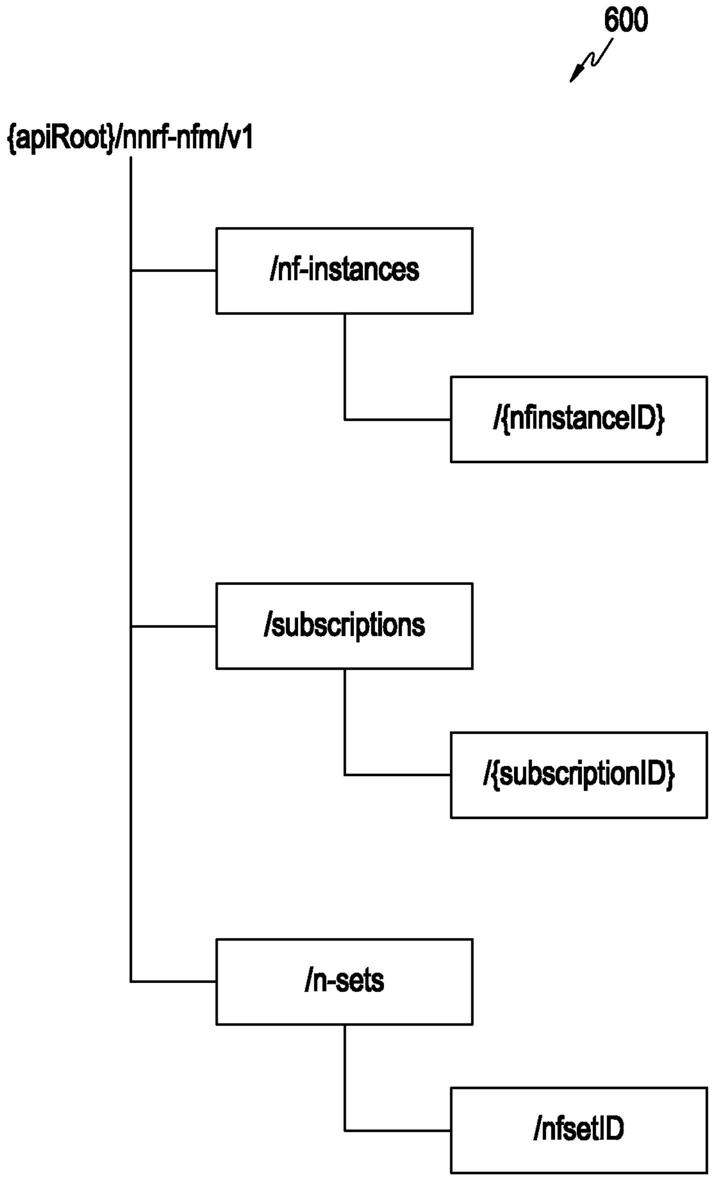
FIG. 6 illustrates an example resource structure of Nnrf_NFManagement API according to embodiments of the present disclosure.

FIG. 6 illustrates an example resource structure of Nnrf_NFManagement application programming interface (API) according to embodiments of the present disclosure. It is provided to extend the resource structure 600 defined in the 3GPP TS 29.510 with a new branch for NF-sets resource collection as shown in dotted outline in FIG. 6.

Figure 7A:
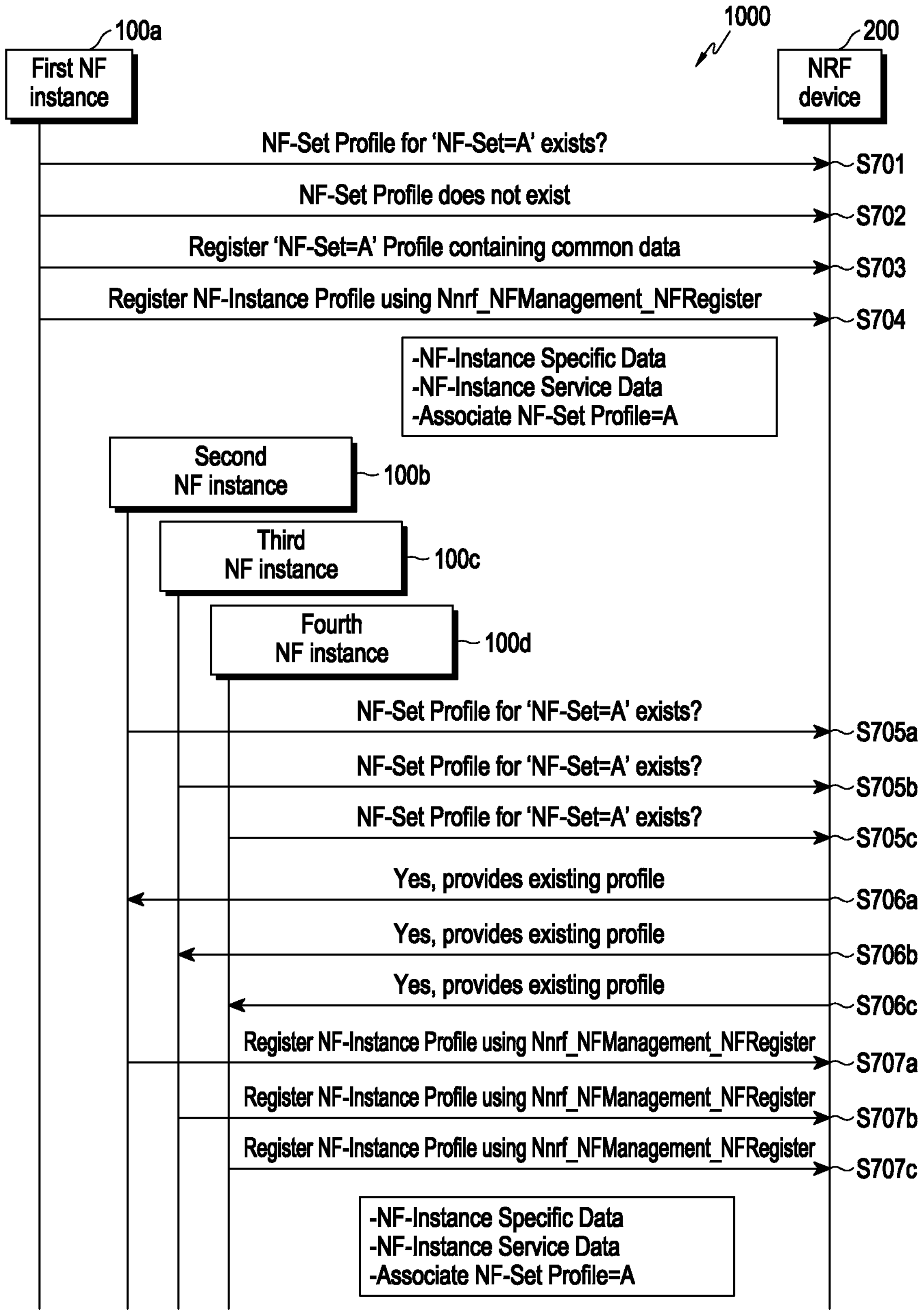
FIG. 7A and FIG. 7B illustrate a representation of an example of NF profile registration in a NRF device using Nnrf_NFManagement service according to embodiments of the present disclosure.

Accordingly, FIG. 7A shows how such a mechanism helps improve the information stored in the NRF device 200 for multiple NF-Instances of the same NF-Set. For the illustration of the solution, assume that 4 NF-Instances 100*a* to 100*d* belong to the NF-Set=A.

In Step S701, when the first NF-Instance (say first NF-Instance, in this illustration) of the NF-Set comes up, the first NF-Instance may first check with the NRF device 200 if the device already has a profile for NF-Set=A by sending a request to the NRF device 200. This may be done by using an existing or new service operation of the Nnrf_NFManagement Service, or by defining a new service. For example, an HTTP GET service operation could be defined on /NF-sets resource, as depicted in FIG. 6.

In Step S702, the NRF device 200 may respond back saying that the NRF device 200 does not have a profile for NF-Set=A. For example, the NRF device 200 can send an HTTP Error "404 Not found" to indicate this.

In Step S703, the first NF-Instance 100*a* may register NF-Set=A profile with the NRF device 200, containing common data, as may have been pre-configured by an operation, administration, and maintenance (OA&M). This can be done by using an existing or new service operation of the Nnrf_NFManagement Service, or by defining a new service. For example, a HTTP PUT/POST method could be defined on /nf-sets or /nf-sets/{nfsetId} resource, as depicted in FIG. 6.

In Step S704, the first NF-Instance 100*a* may then proceed with registering the NF-Instance profile in the NRF device (200) using Nnrf_NFManagement_NFRegister service operation; containing NF-Instance specific data and NF-Instance service data. The NF-Instance Common-data is not included, and instead only a pointer to NF-Set=A's profile is indicated in the NF-Instance profile. The pointer to the NF-Set=A's profile could be the resource URI of the /nf-sets/{nfsetId} resource. In an embodiment, if there are multiple NF-Service instance belonging to a common NF-Service-Set, the NF-Service common data can be registered as part of a separate data-structure so as to not repeat the common data multiple times.

In Steps S705*a*, S705*b*, and S705*c*, the NF-Instances 100*b* to 100*d* may come up and they check with the NRF device (200) if the device already has a profile for NF-Set=A (same as Step S701).

In Steps S706*a*, S706*b*, and S706*c*, since the first NF-Instance 100*a* has already registered the NF-Set=A's profile in Step S703, the NRF device 200 may responds back saying the device has the profile, and may optionally respond back with the NF-Set=A's profile information.

At this point of time, optionally, if any of the NF (second instance-fourth instance) finds that NF-Set=A's profile in the NRF device 200 needs to be updated, the device could use mechanism as defined in Step S703 to update the NF-Set=A's profile.

In Step S707*a*, S707*b*, and S707*c*), the second, third, and fourth NF-Instances 100*b*, 100*c*, and 100*d* may now proceed with registering their NF-Instance profile in the NRF device 200 using Nnrf_NFManagement_NFRegister service operation; containing NF-Instance specific data and NF-Instance service data. The NF-Instance common data is not included, and instead only the pointer to the NF-Set=A's profile is indicated in the NF-Instance profile. The pointer to the NF-Set=A's profile could be the resource URI of the /nf-sets/{nfsetId} resource. In an embodiment herein, if there are multiple NF-Service instances belonging to a common NF-Service-Set, the NF-Service common data can be registered as part of a separate data-structure so as to not repeat the common data multiple times.

Figure 7B:
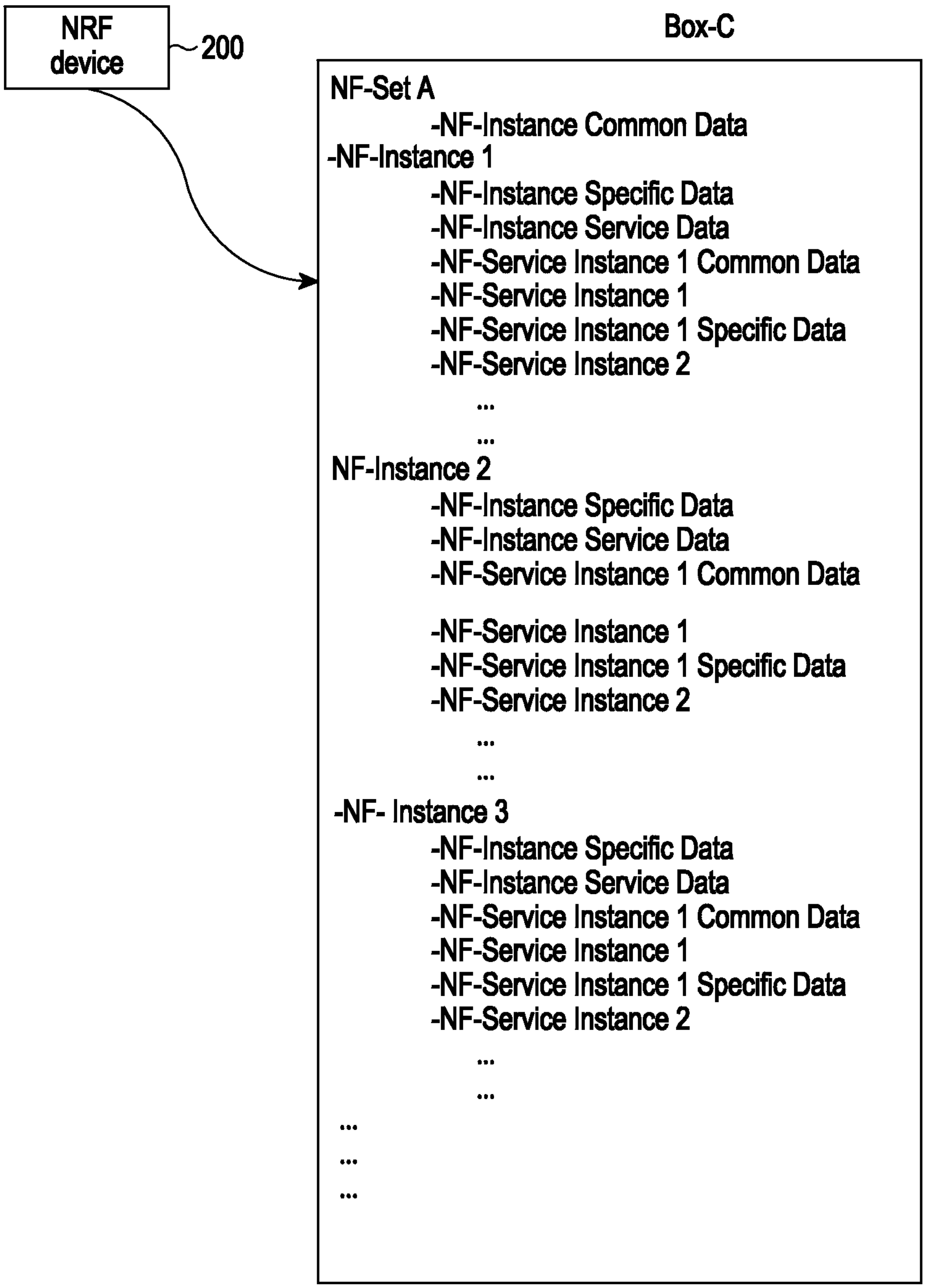

Thus, as shown in Box-C of FIG. 7B, the information stored in the NRF device 200 is not duplicated, neither in signalling from the NF-Instances 100*a* to 100*d*, nor in the storage in the NRF device 200.

In an alternate implementation of Step S701 (and steps S705*a*, S705*b*, and S705*c*), instead of each NF-Instance 100*a* to 100*d* querying the NRF device 200 to know if the NF-Set=A's profile is already present in the NRF device 200, each NF-Instance can be locally configured with the profile-identifier unique at-least within the PLMN, and the associated profile. Then, when each NF-Instance 100*a* to 100*d* registers or updates its profile in the NRF device 200 using the Nnrf_NFManagement_NFRegister service operation, the device includes, in the HTTP payload body, the NF-Instance specific data and NF-Instance service data, but not the NF-Instance common data. The NF-Instance common data is part of a locally configured NF-Set profile and hence only a pointer to the NF-Set profile identifier is included. Upon receiving this message, if the NRF device 200 finds that the device does not have the NF-Set's indicated profile, the device sends an indication in response to Nnrf_NFManagement_NFRegister request, asking NF-Instance to register or update the NF-Set's profile. Based on the presence of such indication in the response, the NF-Instances 100*a* to 100*d* may go and register or update NF-Set's profile into the NRF device 200. If, however, the NRF device 200 finds that the device already has the NF-Set's indicated profile, the device does not send any such indication in the response to Nnrf_NFManagement_NFRegister request, and hence NF-Instances do not need to again register or update NF-Set=A's profile into the NRF device 200.

Additionally, if, say, first NF-Instance 100*a* is configured with NF-Set=A's profile=<profile1>, and the second NF-Instance 100*b* is configured with NF-Set=A's profile=<profile2>, each of the first and second NF-Instances 100*a* and 100*b* may update the NRF device 200 with a separate profile for NF-Set=A.

Figure 8:
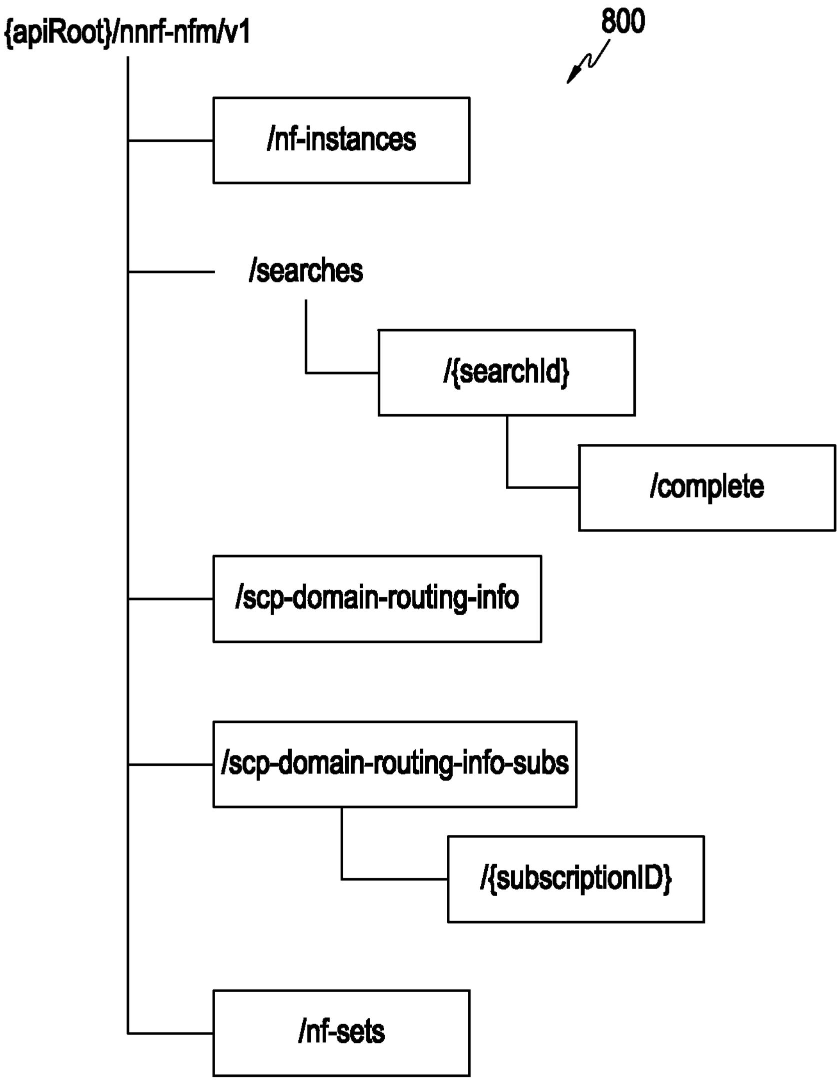
FIG. 8 illustrates an example resource structure of Nnrf_NFDiscovery API according to embodiments of the present disclosure.
Figure 9:
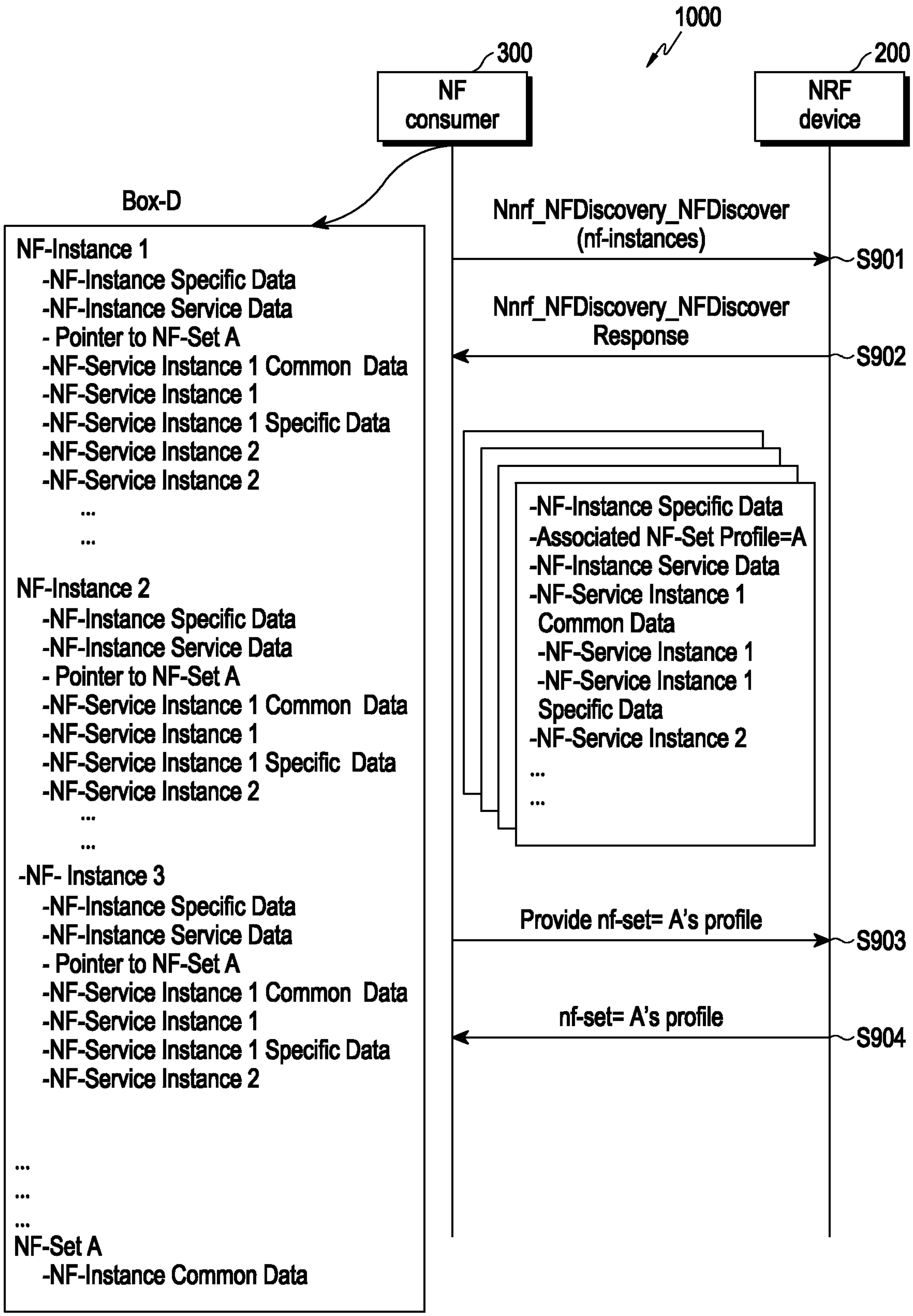
FIG. 9 illustrates a representation of an example of NF discovery in NRF using Nnrf_NFDiscovery service according to embodiments of the present disclosure.

FIG. 8 and FIG. 9 show how such a mechanism of defining NF-set profile helps improve the problem described in FIG. 4. Similar to FIG. 6, FIG. 8 proposes to extend the resource structure 800 of Nnrf_NFDiscovery API with a new branch for NF-sets.

Accordingly, when the NF consumer 300 sends the request to the NRF device 200 to discover the network functions of the particular type (e.g., AMF entity, SMF entity or the like), as shown in FIG. 9, the following sequence of events may happen.

In Step S901, the NF consumer 300 may send the Nnrf_NFDiscovery_NFDiscover request to the NRF device 200 to discover NF-Instances of the particular type.

In Step S902, the NRF device 200 may find 4 NF-Instances (e.g., NF-Instances 100*a*-100*d*), the NF-Instances belonging to the common NF-set=A, and returns in the Nnrf_NFDiscovery_NFDiscover response, containing the NF-Instance specific data and NF-Instance service data of the 4 NF-Instances (100*a*-100*d*). The NF-Instance Common-data is not included, and instead only the pointer to NF-Set=A's profile is indicated in the NF-Instance's profile information. The pointer to the NF-Set=A's profile could be the URI of the resource belonging to NF-Set=A's profile.

In Step S903, upon receiving the response from the NRF device 200, the NF consumer 300 may check if the device already has the profile of NF-set=A. If not, the NF consumer 300 may send a request to the NRF device 200 to provide NF-set=A's profile. This can be done by using an existing or new service operation of the Nnrf_NFDiscovery Service, or by defining the new service. For example, an HTTP GET method based service operation could be defined on/NF-sets resource as provided in FIG. 8.

In Step S904, the NRF device 200 may respond back with NF-set=A's profile.

Thus, the payload-size of HTTP response to Discovery requests reduces, and the NF consumer 300 and/or the NRF device 200 do not need to cache duplicate information (as shown in Box-D of FIG. 9).

Figure 10:
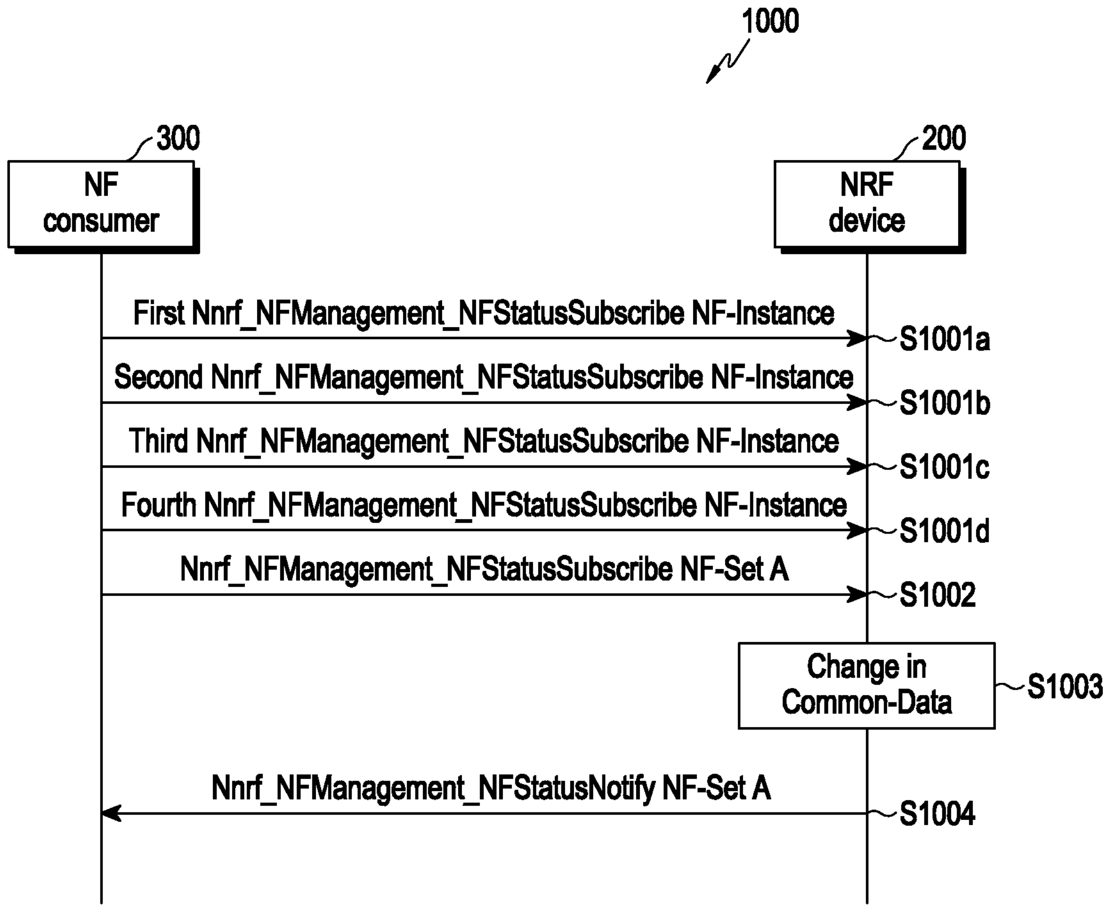
FIG. 10 illustrates a representation of an example of NF profile change notification to the subscribing NF consumers using Nnrf_NFManagement service according to embodiments of the present disclosure.

The solution provided in FIG. 7 also helps resolve the issue depicted in FIG. 5. As shown in FIG. 10, since the common-data is now stored in a separate NF-set profile, the NF consumer 300 may subscribe to, for example, data-change notifications for changes in NF-Set=A's profile. Whenever there is a change in Common-data of the individual NF-Instance's profiles, they need is update the NF-Set=A's profile in the NRF device 200. This may result in a single notification (e.g., step S1004) generated towards NF consumer 300.

Referring to FIG. 10, the NF consumer 300 may subscribe to the NRF device 200 to receive data-change notifications using first, second, third, and fourth Nnrf_NFManagement_NFStatusSubscribe service operation at steps S1001*a*, S1001*b*, S1001*c*, and S1001*d*. The subscription request is done for each NF-Instance 100*a* to 100*d*. At step S1002, the NF consumer 300 may subscribe to, for example, data-change notifications for changes in NF-Set=A's profile by a Nnrf_NFManagement_NFStatusSubscribe NF-Set A. At step S1003, the NRF device 200 may detect a change in the profiles of the NF-Instances 100*a*-100*d*, e.g., due to NFs performing Nnrf_NFManagement_NFUpdate service operation as shown in FIG. 3 or like so. At step S1004, the NRF device 200 may send a notification (e.g., Nnrf_NF-Management_NFStatusNotify NF Set A) to the NF consumer 300.

A new issue manifests in case that the common-data is registered into the NRF device 200 separately using, e.g., NF-Set profile: which member NF-Instance may update the NF-Set profile into NRF device 200 when there is a change in the common data? It is possible that the NF-Instances 100*a* to 100*d* try to update NF-Set profile simultaneously, for the same change which is an unnecessary behavior. In order to resolve this, in an embodiment, it is provided that member NF-Instances elect the master NF-instance, which is responsible of updating the NF-Set profile in NRF device 200 when there is a change in common profile parameters. Election of master could be determined, e.g., based on a priority configuration of the NF-Instance, whereby highest priority NF-Instance becomes master, based on configuration and so on. If the highest-priority NF-Instance goes down, the next-highest priority NF-Instance takes role of master. Thus, unnecessary and duplicate updates into NRF device (200) can be avoided.

Figure 11:
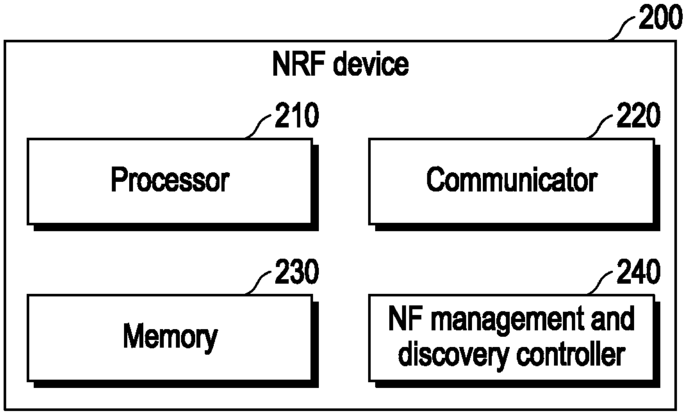
FIG. 11 illustrates various hardware components of a NRF device according to embodiments of the present disclosure.

FIG. 11 illustrates various hardware components of the NRF device (200), according to embodiments of the present disclosure. In an embodiment, the NRF device 200 may include at least one of a processor 210, a communicator 220, a memory 230, or a NF management and discovery controller 240. The processor 210 may be coupled with the communicator 220, the memory 230, and the NF management and discovery controller 240. In an embodiment, the NF management and discovery controller 240 may be included in the processor 210, or integrated with the processor 210.

The NF management and discovery controller 240 may receive the first registration request to register the common data in the separate profile from the first NF instance entity 100*a*. In an embodiment, the common data refers to the profile information common to a plurality of NF-instances. In another embodiment, the common data refers to data common to NF-Instances belonging to the NF-Set.

In an embodiment, the NF management and discovery controller 240 may receive the first determination request to determine whether the NF set profile for the first NF set exists with the NRF device 200. Based on the determination request, the NF management and discovery controller 240 may send the first response indicating that the NF set profile for the first NF set does not exist with the NRF device 200. Further, the NF management and discovery controller 240 may receive the first registration request to register the common data in the separate profile into the NRF device 200.

In an embodiment, the NF management and discovery controller 240 may receive the second registration request to register the NF instance profile from the first NF instance entity 100*a*. The NF instance profile includes the NF instance specific data and the pointer to profile of the common data. In an embodiment, the NF instance specific data refers to profile information specific to the NF-Instances. In an embodiment, the NF-Instances belong to the NF-Set. In an embodiment, the second registration request to register the NF instance profile is received using the Nnrf_NFManagement_NFRegister.

In an embodiment, the NF management and discovery controller 240 may receive the registration request to register the NF instance profile with the NRF device 200 from the first NF instance entity 100*a*. Further, the NF management and discovery controller 240 may send a first response indicating that the profile with common data does not exist with the NRF device 200. Further, the NF management and discovery controller 240 may receive the registration request to register the common data in the separate profile into the NRF device 200.

In an embodiment, the NF management and discovery controller 240 may receive the discovery request to discover NF-instances of the particular type from the NF consumer 300. Based on the discovery request, the NF management and discovery controller 240 may identify NF instances. Further, the NF management and discovery controller 240 may sends the discovery response to the NF consumer 300. The discovery response may include the NF instance specific data of a plurality of NF-instances, and the pointer to profile of the NF set profile. The pointer to profile of the NF set profile instead of the common data may be included in the discovery response.

In an embodiment, the NF management and discovery controller 240 may receive the discovery request to share the NF-set profile from the NF consumer 300. The NF consumer 300 may determine that the NF-set profile is not available in the NF consumer 300. Based on the discovery request, the NF management and discovery controller 240 may send the NF-set profile to the NF consumer 300.

In an embodiment, the NF management and discovery controller 240 may receive the subscription request associated with the data change notification for changes in the NF set profile. Further, the NF management and discovery controller 240 may determines the change in the common data associated with the NF set profile. Further, the NF management and discovery controller 240 may send the message indicating the change in the common data associated with the NF set profile to the NF consumer 300.

The NF management and discovery controller 240 may be implemented by analog and/or digital circuits such as logic gates, integrated circuits, microprocessors, microcontrollers, memory circuits, passive electronic components, active electronic components, optical components, hardwired circuits and the like, and may optionally be driven by firmware.

In an embodiment, the processor 210 may be configured to execute instructions stored in the memory 230 and to perform various processes. The communicator 220 may be configured for communicating internally between internal hardware components and with external devices via one or more networks. The memory 230 may also store instructions to be executed by the processor 210. The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In certain examples, a non-transitory storage medium may store data that can, over time, change (e.g., in random access memory (RAM) or cache).

Although the FIG. 11 shows various hardware components of the NRF device 200 but it is understood that other embodiments are not limited thereon. In other embodiments, the NRF device 200 may include less or greater number of components. Further, the labels or names of the components are used only for illustrative purpose and does not limit the scope of the present disclosure. One or more components can be combined together to perform same or substantially similar function in the NRF device 200.

Figure 12:
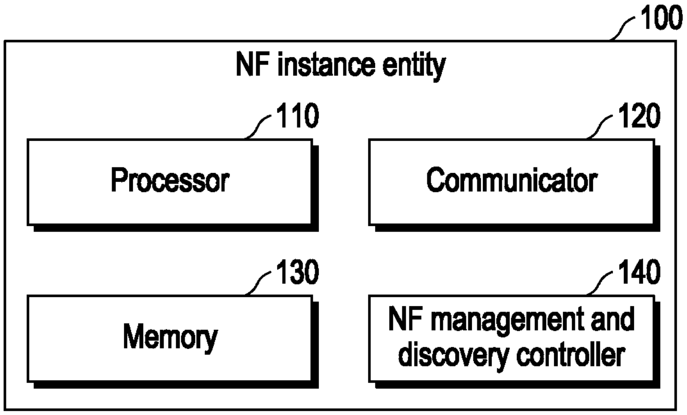
FIG. 12 illustrates various hardware components of a NF instance entity according to embodiments of the present disclosure.

FIG. 12 illustrates various hardware components of the NF instance entity 100 according to embodiments of the present disclosure. In an embodiment, the NF instance entity 100 may include a processor 110, a communicator 120, a memory 130, or a NF management and discovery controller 140. The processor 110 may be coupled with the communicator 120, the memory 130 and the NF management and discovery controller 140. In an embodiment, the NF management and discovery controller 140 may be included in the processor 110, or integrated with the processor 110.

The NF management and discovery controller 140 may be configured to categorize NF instances profile data into the common data, and the specific data. The common data is identified and registered as "NF-Set" profile in the NRF device 200. Further, the NF management and discovery controller 140 may be configured to send the first registration request to register the common data in the separate profile into the NRF device 200.

In an embodiment, the NF management and discovery controller 140 may send the first determination request to determine whether the NF set profile for the first NF set exists with the NRF device 200. Based on the determination request, the NF management and discovery controller 140 may receive the first response indicating that the NF set profile for the first NF set does not exist with the NRF device 200. Further, the NF management and discovery controller 140 may send the first registration request to register the common data in the separate profile into the NRF device (200).

The NF management and discovery controller 140 may send the second registration request to register the NF instance profile with the NRF device 200. The NF instance profile may include the NF instance specific data and the pointer to profile of the common data.

In an embodiment, the NF management and discovery controller 140 may send the registration request to register the NF instance profile with the NRF device 200. The NF instance profile may include the NF instance specific data and the pointer to profile of the common data. Further, the NF management and discovery controller 140 may receive the first response indicating that the profile with common data does not exist with the NRF device 200. Further, the NF management and discovery controller 140 may send the second registration request to register the common data in the separate profile into the NRF device 200.

The NF management and discovery controller 140 may be implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor 110 may be configured to execute instructions stored in the memory 130 and to perform various processes. The communicator 120 may be configured for communicating internally between internal hardware components and with external devices via one or more networks. The memory 130 may also store instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

Although the FIG. 12 shows various hardware components of the NF instance entity 100 but it is understood that other embodiments are not limited thereon. In other embodiments, the NF instance entity 100 may include less or greater number of components. Further, the labels or names of the components are used only for illustrative purpose and does not limit the scope of the present disclosure. One or more components can be combined together to perform same or substantially similar function in the NF instance entity 100.

Figure 13:
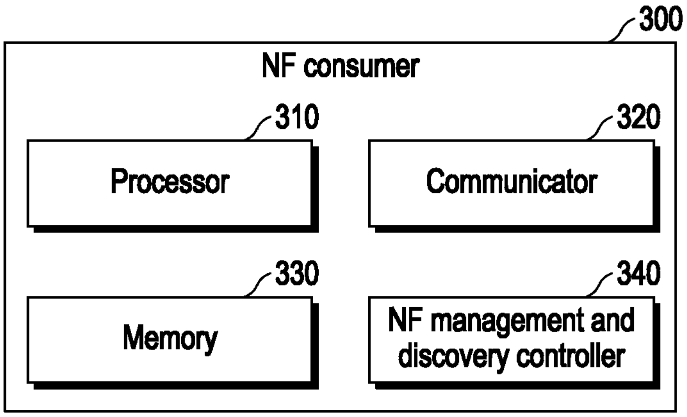
FIG. 13 illustrates various hardware components of a NF consumer according to embodiments of the present disclosure.

FIG. 13 illustrates various hardware components of the NF consumer 300 according to embodiments of the present disclosure. In an embodiment, the NF consumer 300 may include at least one of a processor 310, a communicator 320, a memory 330, or a NF management and discovery controller 340. The processor 310 may be coupled with the communicator 320, the memory 330 and the NF management and discovery controller 340. In an embodiment, the NF management and discovery controller 340 may be included in the processor 310, or integrated with the processor 310.

The NF management and discovery controller 340 may send the discovery request to discover NF instances of the particular type to the NRF device 200. The NRF device 200 may identify NF instances based on the discovery request, and the NF instances are associated with the NF-instance common data. Further, the NF management and discovery controller 340 may receive the discovery response from the NRF device 200. The discovery response may include the NF instance specific data of multiple NF-instances matching requested type, and the indicator to the common data profile. The indicator to the NF set profile instead of the common data may be included in the discovery response.

In an embodiment, the NF management and discovery controller 340 may send the request to discover the NF-set profile to the NRF device 200, upon determining that the NF-set profile is not available in the NF consumer 300. Based on the discovery request, the NF management and discovery controller 340 receives the NF-set profile from the NRF device 200.

In an embodiment, the NF management and discovery controller 340 sends the subscription request associated with the data change notification for changes in the NF set profile to the NRF device 200. Upon determining the change in the common data associated with the NF set profile at the NRF device 200, the NF management and discovery controller 340 receives the message indicating the change in the common data associated with the NF set profile from the NRF device 200.

The NF management and discovery controller 340 may be implemented by analog and/or digital circuits such as logic gates, integrated circuits, microprocessors, microcontrollers, memory circuits, passive electronic components, active electronic components, optical components, hardwired circuits and the like, and may optionally be driven by firmware.

In an embodiment, the processor 310 may be configured to execute instructions stored in the memory 330 and to perform various processes. The communicator 320 may be configured for communicating internally between internal hardware components and with external devices via one or more networks. The memory 330 may also store instructions to be executed by the processor 310. The memory 330 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 330 may, in some examples, be considered a non-transitory storage medium. The term "non-transitory" may indicate that the storage medium is not embodied in a carrier wave or a propagated signal. However, the term "non-transitory" should not be interpreted that the memory 330 is non-movable. In certain examples, a non-transitory storage medium may store data that can, over time, change (e.g., in random access memory (RAM) or cache).

Although the FIG. 13 shows various hardware components of the NF consumer 300 but it is understood that other embodiments are not limited thereon. In other embodiments, the NF consumer 300 may include less or greater number of components. Further, the labels or names of the components are used only for illustrative purpose and does not limit the scope of the present disclosure. One or more components can be combined together to perform same or substantially similar function in the NF consumer 300.

Figure 14:
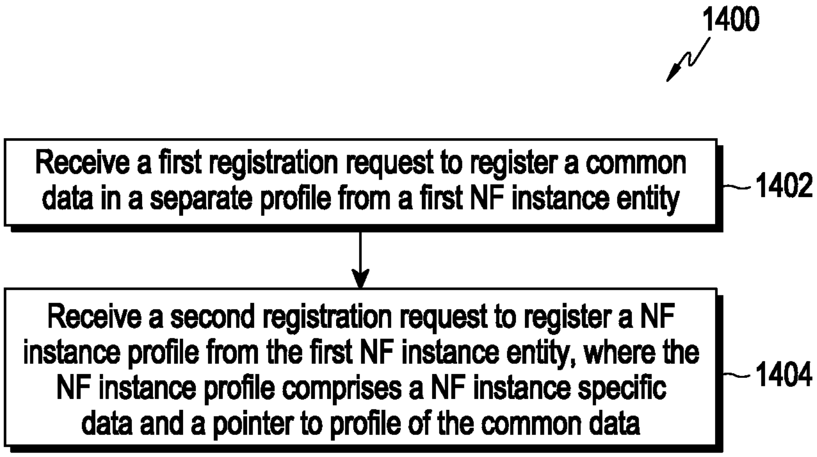
FIG. 14 illustrates a flowchart of a method, implemented by the NRF device, for performing NF management and discovery in a wireless network according to embodiments of the present disclosure.

FIG. 14 illustrates a flowchart 1400 of a method, implemented by the NRF device 200, for performing the NF management and discovery in the wireless network (e.g., 5G network 1000) according to embodiments of the present disclosure. The steps 1402 and 1404 may be handled by the NF management and discovery controller 240.

At step 1402, the method may include receiving the first registration request to register the common data in the separate profile from the first NF instance entity. At step 1404, the method may include receiving the second registration request to register the NF instance profile from the first NF instance entity 100. The NF instance profile includes the NF instance specific data and the pointer to profile of the common data.

Figure 15:
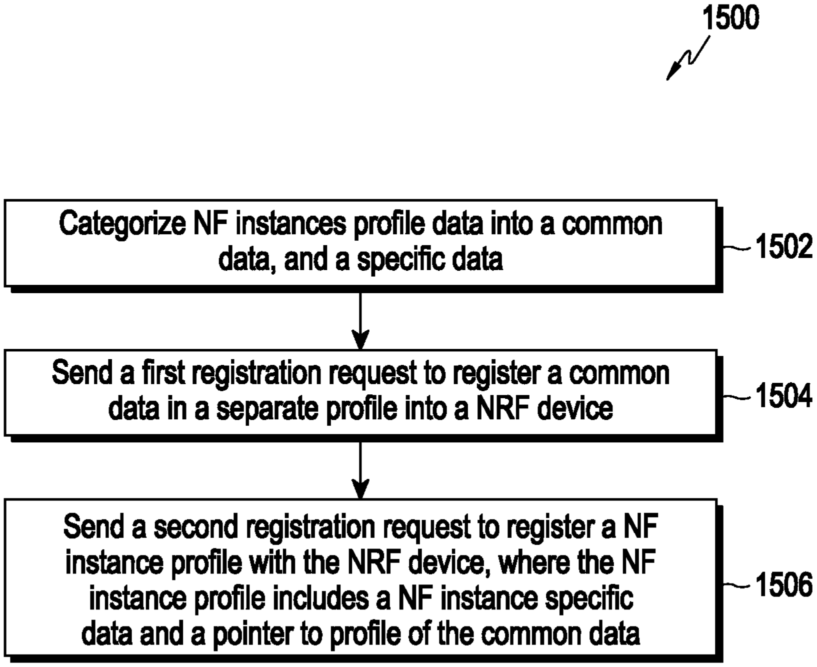
FIG. 15 illustrates a flow-chart of a method, implemented by the NF instance entity, for performing NF management and discovery in a wireless network according to embodiments of the present disclosure.

FIG. 15 illustrates a flowchart 1500 of a method, implemented by the NF instance entity 100, for performing the NF management and discovery in a wireless network 1000 according to embodiments of the present disclosure. The steps 1502, 1504, and 1506 may be handled by the NF management and discovery controller 140.

At step 1502, the method may include categorizing NF instances profile data into the common data, and the specific data. At step 1504, the method may include sending the first registration request to register the common data in the separate profile into the NRF device 200. At step 1506, the method may include sending the second registration request to register the NF instance profile with the NRF device 200. The NF instance profile includes the NF instance specific data and the pointer to profile of the common data.

Figure 16:
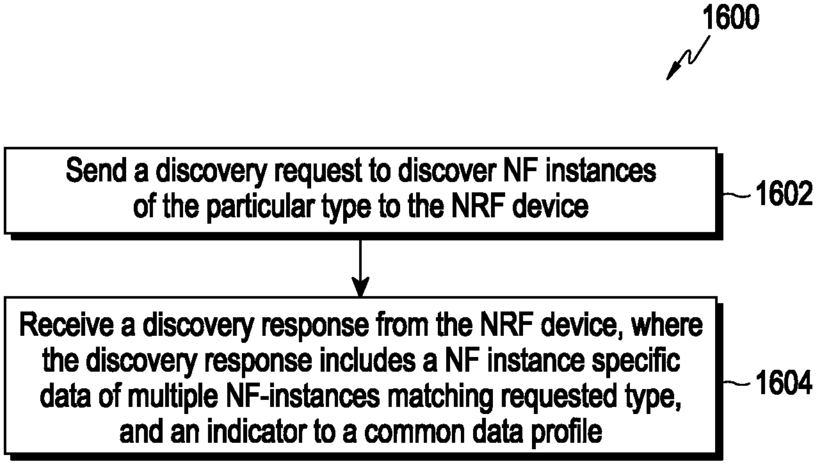
FIG. 16 illustrates a flow-chart of a method, implemented by the NF consumer, for performing NF management and discovery in a wireless network according to embodiments of the present disclosure.

FIG. 16 illustrates a flow-chart 1600 of a method, implemented by the NF consumer 300, for performing NF management and discovery in the wireless network 1000 according to embodiments of the present disclosure. The steps 1602 and 1604 may be handled by the NF management and discovery controller 340.

At step 1602, the method may include sending the discovery request to discover NF instances of the particular type to the NRF device 200. At step 1604, the method may include receiving the discovery response from the NRF device 200. The discovery response includes the NF instance specific data of multiple NF-instances matching requested type, and the indicator to the common data profile.

Figure 17:
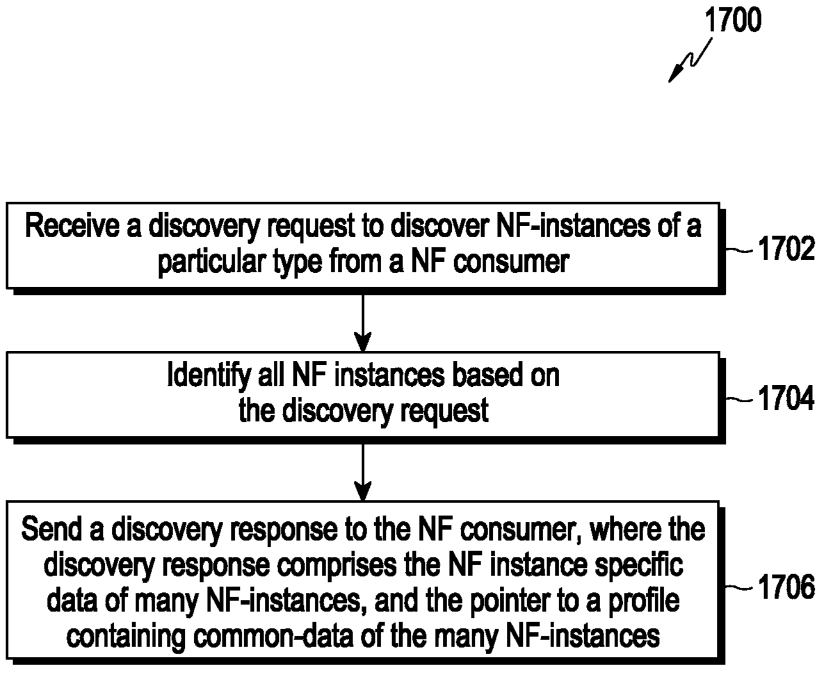
FIG. 17 illustrates a flowchart of a method, implemented by the NRF device, for performing the NF management and discovery in the wireless network according to embodiments of the present disclosure.

FIG. 17 illustrates a flowchart 1700 of a method, implemented by the NRF device 200, for performing the NF management and discovery in the wireless network 1000 according to embodiments of the present disclosure. The steps 1702, 1704, and 1706 may be handled by the NF management and discovery controller 240.

At step 1702, the method may include receiving the discovery request to discover NF-instances of the particular type from the NF consumer 300. At step 1704, the method may include identifying NF instances based on the discovery request. At step 1706, the method may include sending the discovery response to the NF consumer 300. The discovery response includes the NF instance specific data of a plurality of NF-instances, and the pointer to a profile containing common-data of the plurality of NF-instances.

The various actions, acts, blocks, steps, or the like in the flowcharts (e.g., 1400, 1500, 1600, and 1700) may be performed in the order presented, in a different order or simultaneously. Further, in some embodiments, some of the actions, acts, blocks, steps, or the like may be omitted, added, modified, skipped, or the like without departing from the scope of the present disclosure.

Embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network repository function (NRF) for performing network function (NF) management and discovery in a wireless communication system, the method comprising:

receiving, from a first NF consumer, a first registration request to register first shared data related to an NF set including a plurality of NFs, wherein the first shared data is identified by a first identifier within a public mobile network (PLMN) and wherein the first shared data is associated with an NF instance profile of the plurality of NFs;

receiving, from a second NF consumer, a second registration request to register the NF instance profile including a second identifier of second shared data, wherein the second registration request includes the NF instance profile; and if the NRF identifies that the second registration request fails based on the second identifier being unknown to the NRF, transmitting, to the second NF consumer, an indication indicating that the second registration request fails in response to the second registration request.

2. The method of claim 1, wherein the first shared data refers to profile information that is common to a plurality of NF-instances, wherein the plurality of NF-instances belong to the NF set, wherein the first shared data refers to data that is common to the plurality of NF-instances belonging to the NF set, and wherein the second registration request to register the NF instance profile is received using an NF register message.

3. The method of claim 1, further comprising:

receiving, from the second NF consumer, a third registration request to register another NF instance profile into the NRF.

4. The method of claim 1, further comprising:

receiving, from the second NF consumer, a discovery request to discover NF-instances of a particular type;

identifying the NF-instances based on the discovery request; and transmitting, to the second NF consumer, a discovery response, wherein the discovery response includes NF instance specific data of a plurality of NF-instances, and a uniform resource identifier (URI) of a profile containing third shared data.

5. The method of claim 4, wherein the URI of pointer for the profile is included in the discovery response, excluding the third shared data.

6. The method of claim 1, further comprising:

receiving, from the second NF consumer, a discovery request to share an NF set profile; and transmitting, to the second NF consumer, the NF set profile based on the discovery request.

7. The method of claim 1, further comprising:

receiving, from the second NF consumer, a subscription request associated with a data change notification for changes in an NF set profile;

determining a change in the NF set profile; and transmitting, to the second NF consumer, a message indicating the change in the NF set profile.

8. A method performed by a second network function (NF) consumer for performing NF management and discovery in a wireless communication system, the method comprising:

transmitting, to a network repository function (NRF), a second registration request to register an NF instance profile including a second identifier of second shared data, wherein the second registration request includes the NF instance profile; and if the NRF identifies that the second registration request fails based on the second identifier being unknown to the NRF, receiving, from the NRF, an indication indicating that the second registration request fails, wherein a first registration request is transmitted, to the NRF, to register first shared data related to an NF set including a plurality of NFs, and wherein the first shared data is identified by a first identifier within a public mobile network (PLMN) and the first shared data is associated with the NF instance profile of the plurality of NFs.

9. The method of claim 8, wherein the first shared data refers to profile information that is common to a plurality of NF-instances, wherein the plurality of NF-instances belong to the NF set, wherein the first shared data refers to data that is common to a plurality of NF-instances belonging to the NF set, and wherein the second registration request to register the NF instance profile is transmitted using an NF register message.

10. The method of claim 8, further comprising:

transmitting, to the NRF, a third registration request to register another NF instance profile into the NRF.

11. A network repository function (NRF) entity, the NRF entity comprises:

a transceiver;

memory; and a controller coupled with the memory and the transceiver, the controller configured to:

receive, from a first NF consumer, a first registration request to register first shared data related to an NF set including a plurality of NFs, wherein the first shared data is identified by a first identifier within a public mobile network (PLMN) and the first shared data is associated with an NF instance profile of the plurality of NFs, receive, from a second NF consumer, a second registration request to register the NF instance profile including a second identifier of second shared data, wherein the second registration request includes the NF instance profile; and if the NRF identifies that the second registration request fails based on the second identifier being unknown to the NRF, transmit, to the second NF consumer, an indication indicating that the second registration request fails in response to the second registration request.

12. The NRF entity of claim 11, wherein the first shared data refers to profile information that is common to a plurality of NF-instances, wherein the plurality of NF-instances belong to the NF set, and wherein the first shared data refers to data that is common to the plurality of NF-instances belonging to the NF set, and wherein the second registration request to register the NF instance profile is transmitted using an NF register message.

13. The NRF entity of claim 11, wherein the controller is further configured to:

receive, from the second NF consumer, a discovery request to discover NF-instances of a particular type, identify the NF instances based on the discovery request, and transmit, to the second NF consumer, a discovery response, wherein the discovery response includes NF instance specific data of a plurality of NF-instances and a uniform resource identifier (URI) of a profile containing third shared data.

14. The NRF entity of claim 11, wherein the controller is further configured to:

receive, from the second NF consumer, a discovery request to share an NF set profile; and transmit, to the second NF consumer, the NF set profile based on the discovery request.

15. The NRF entity of claim 11, wherein the controller is further configured to:

receive, from the second NF consumer, a third registration request to register another NF instance profile into the NRF.

16. A network function (NF) consumer entity, the NF consumer entity comprises:

a transceiver;

memory; and a controller coupled with the memory and the transceiver, the controller configured to:

transmit, to a network repository function (NRF), a second registration request to register an NF instance profile including a second identifier of second shared data, wherein the second registration request includes the NF instance profile; and if the NRF identifies that the second registration request fails based on the second identifier being unknown to the NRF, receive, from the NRF, an indication indicating that the second registration request fails, in response to the second registration request, wherein a first registration request is transmitted, to the NRF, to register first shared data related to an NF set including a plurality of NFs, and wherein the first shared data is identified by a first identifier within a public mobile network (PLMN) and the first shared data is associated with the NF instance profile of the plurality of NFs.

* * * * *